INVENTOR.
DENNIS DANIELS
Hill, Sherman, Meroni, Gross & Simpson
ATTORNEYS

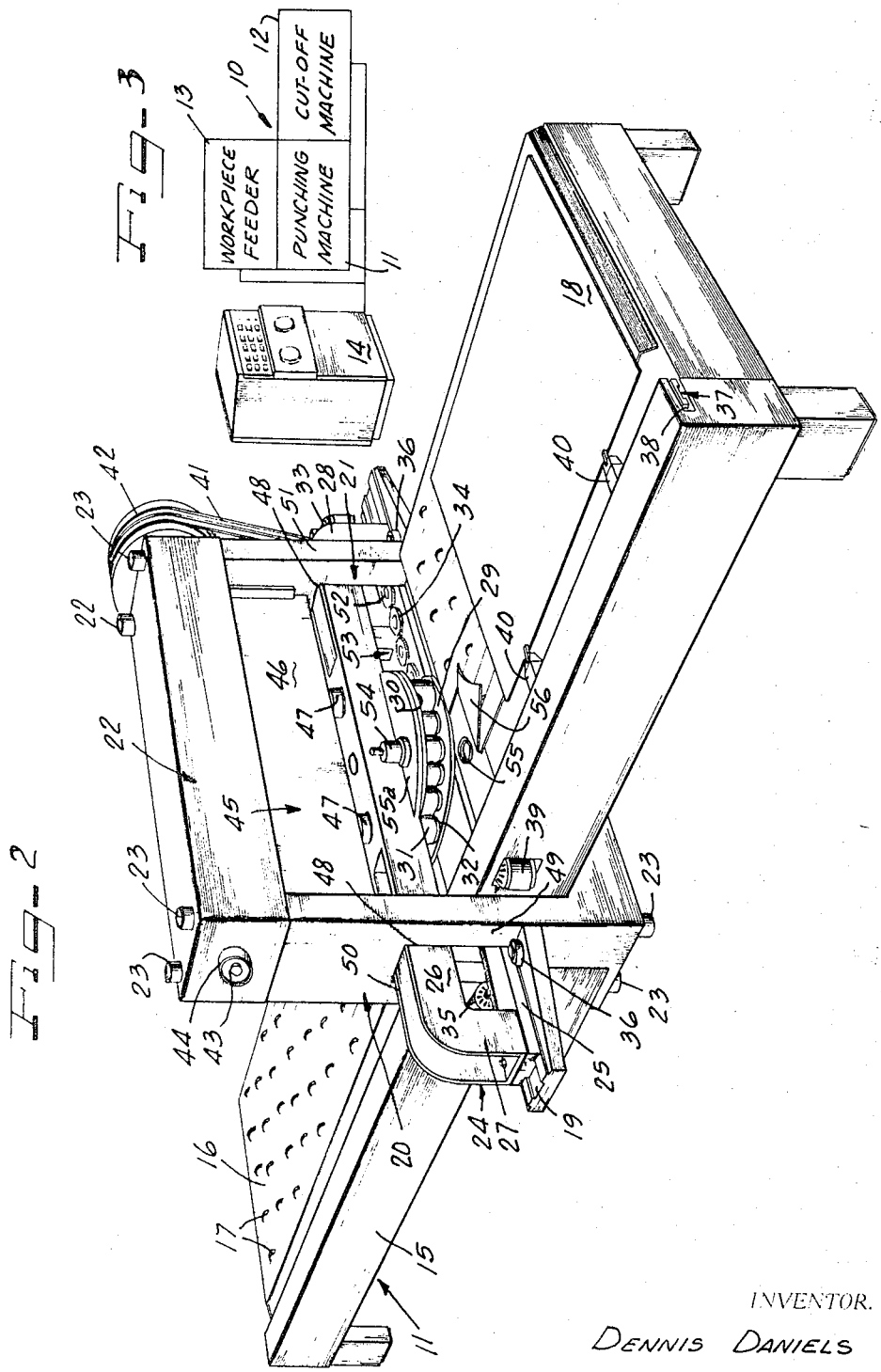

June 17, 1969

D. DANIELS 3,449,991

PUNCH PRESS

Filed Feb. 6, 1967

INVENTOR.
DENNIS DANIELS

ATTORNEYS

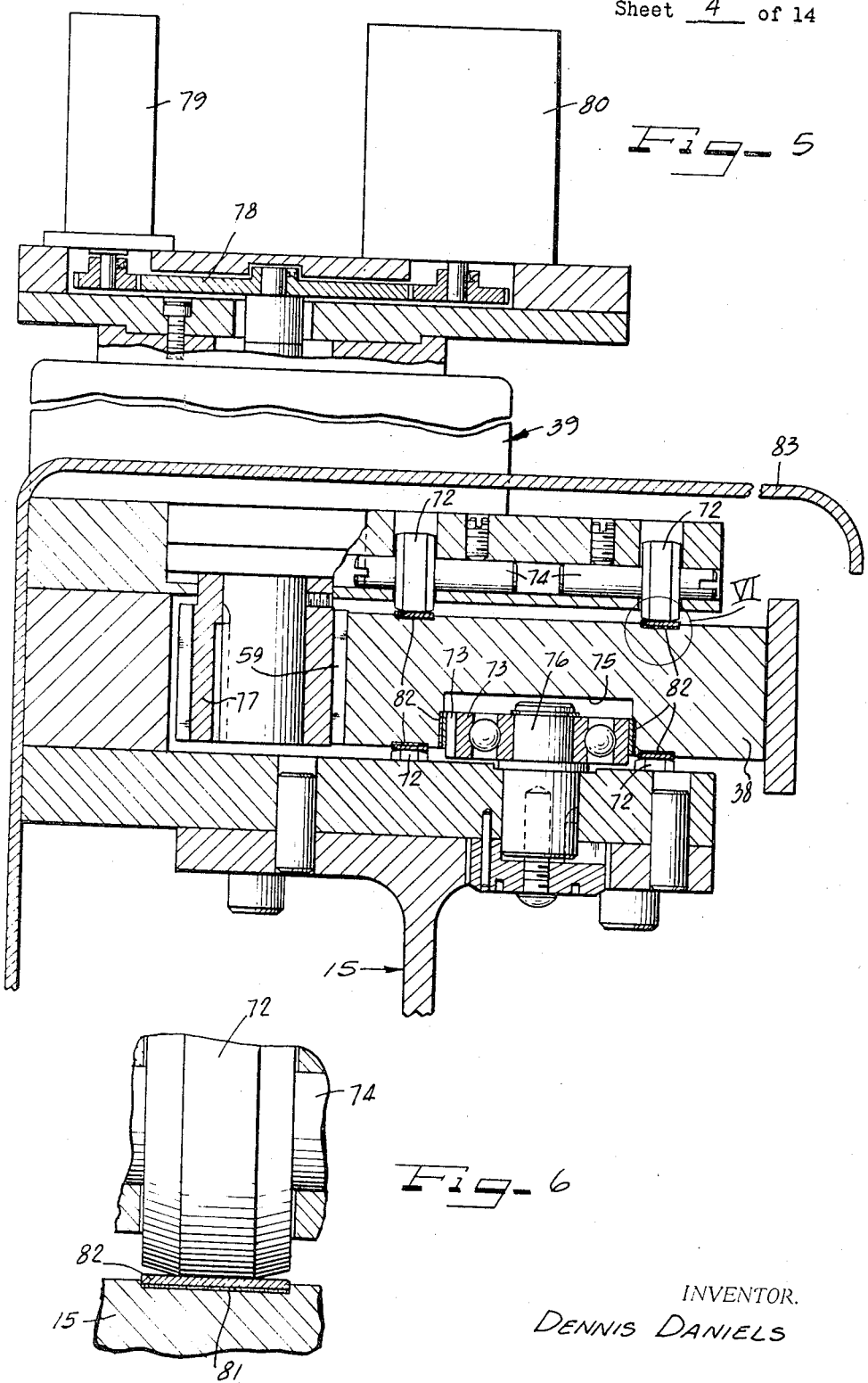

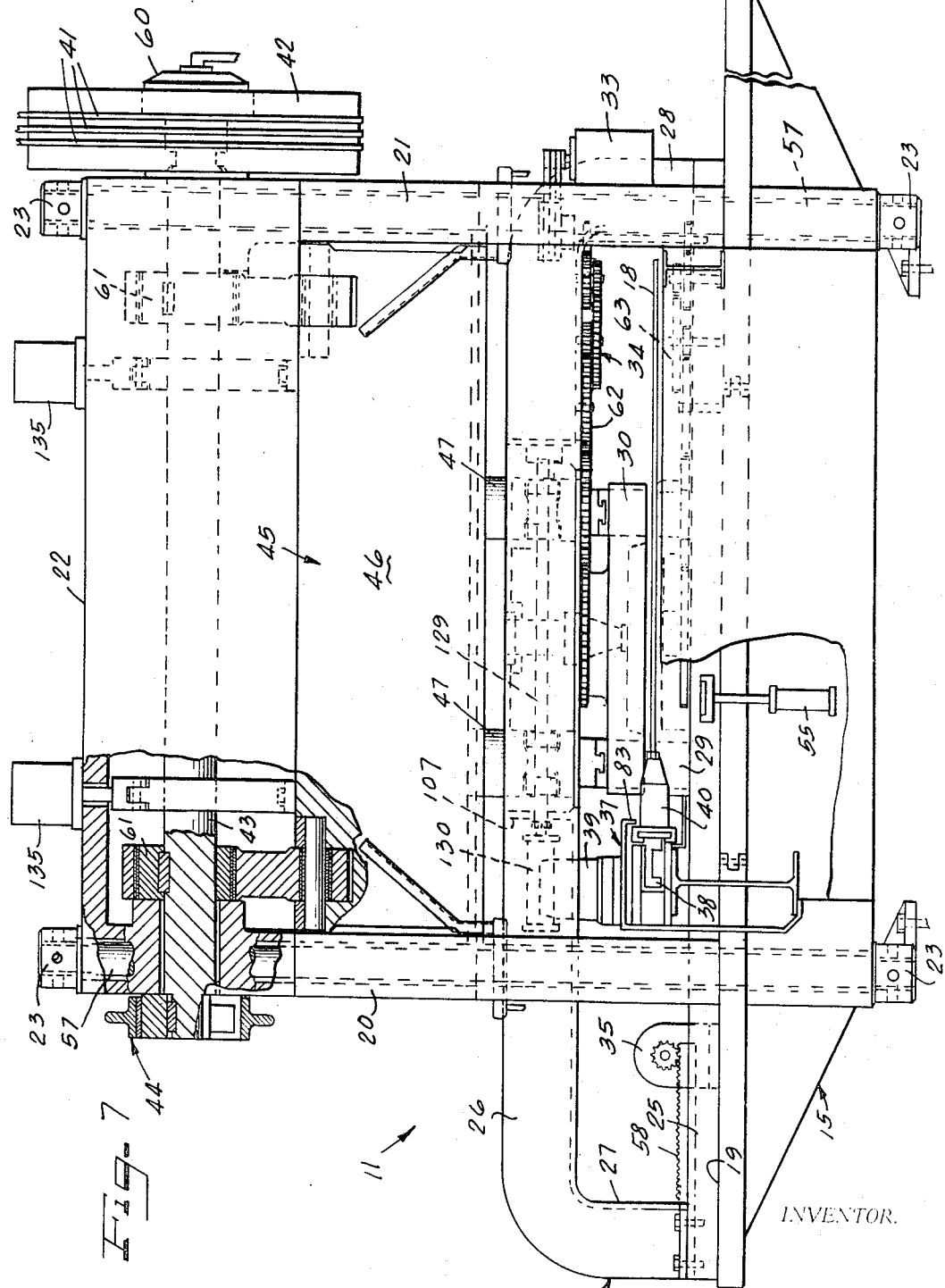

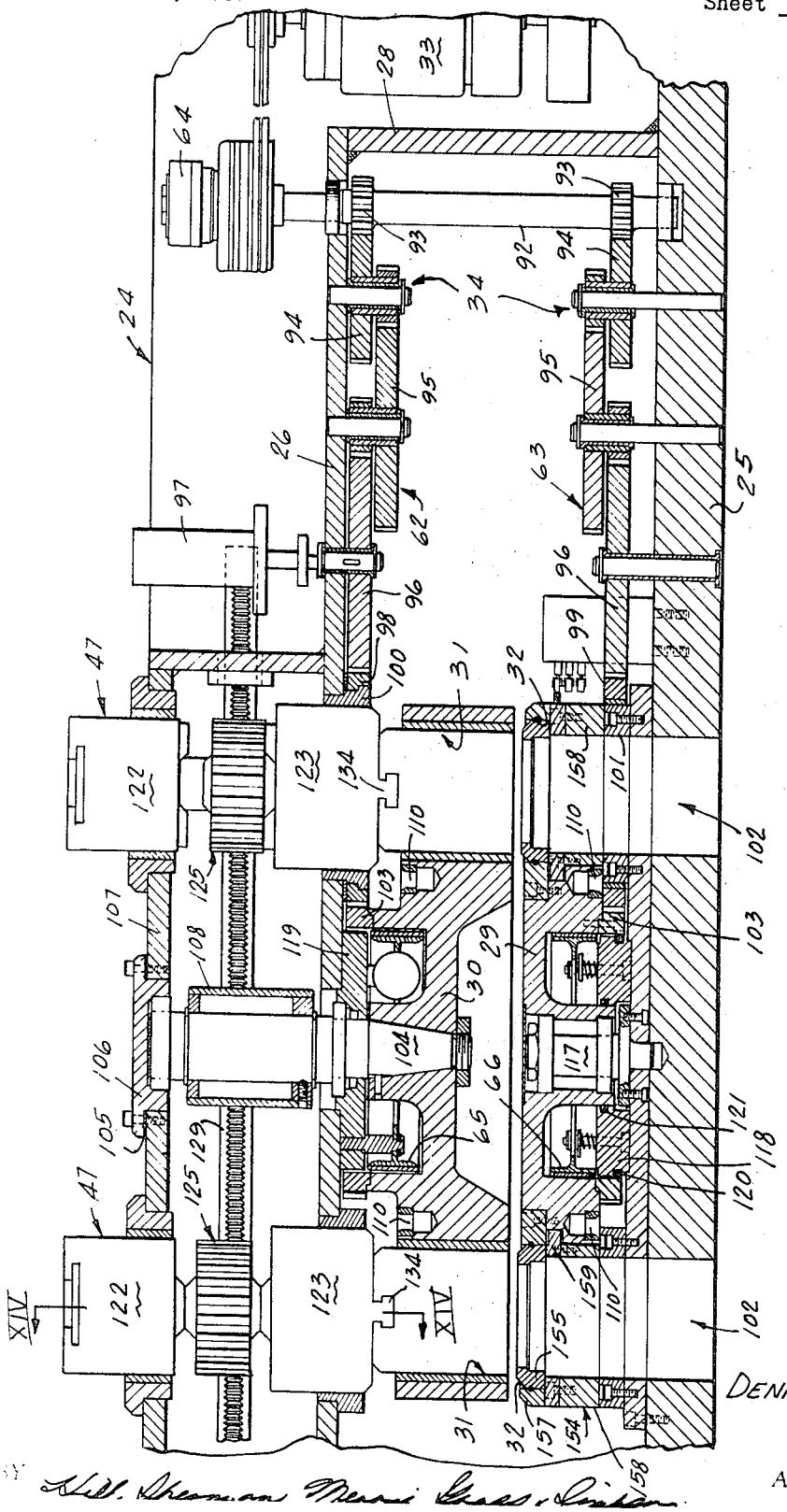

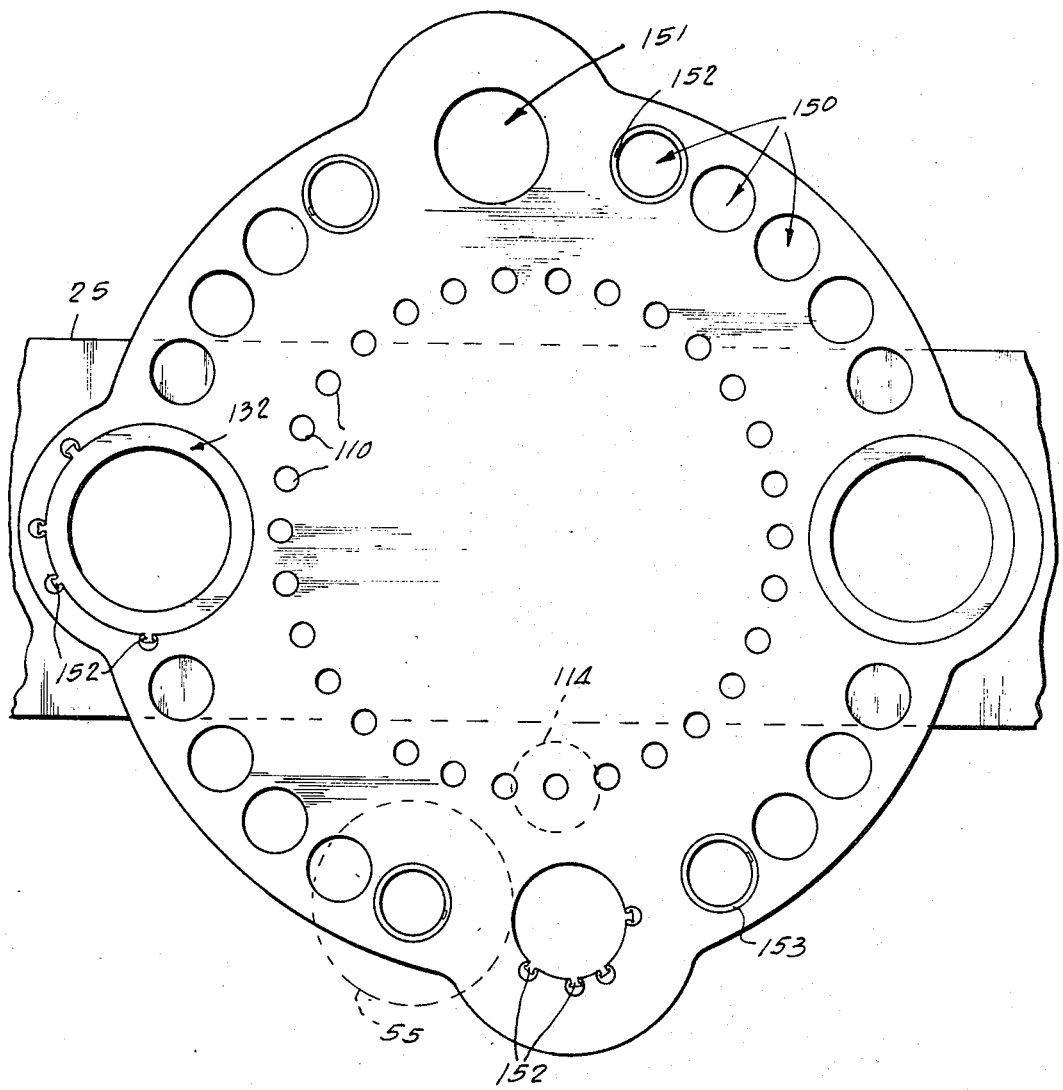

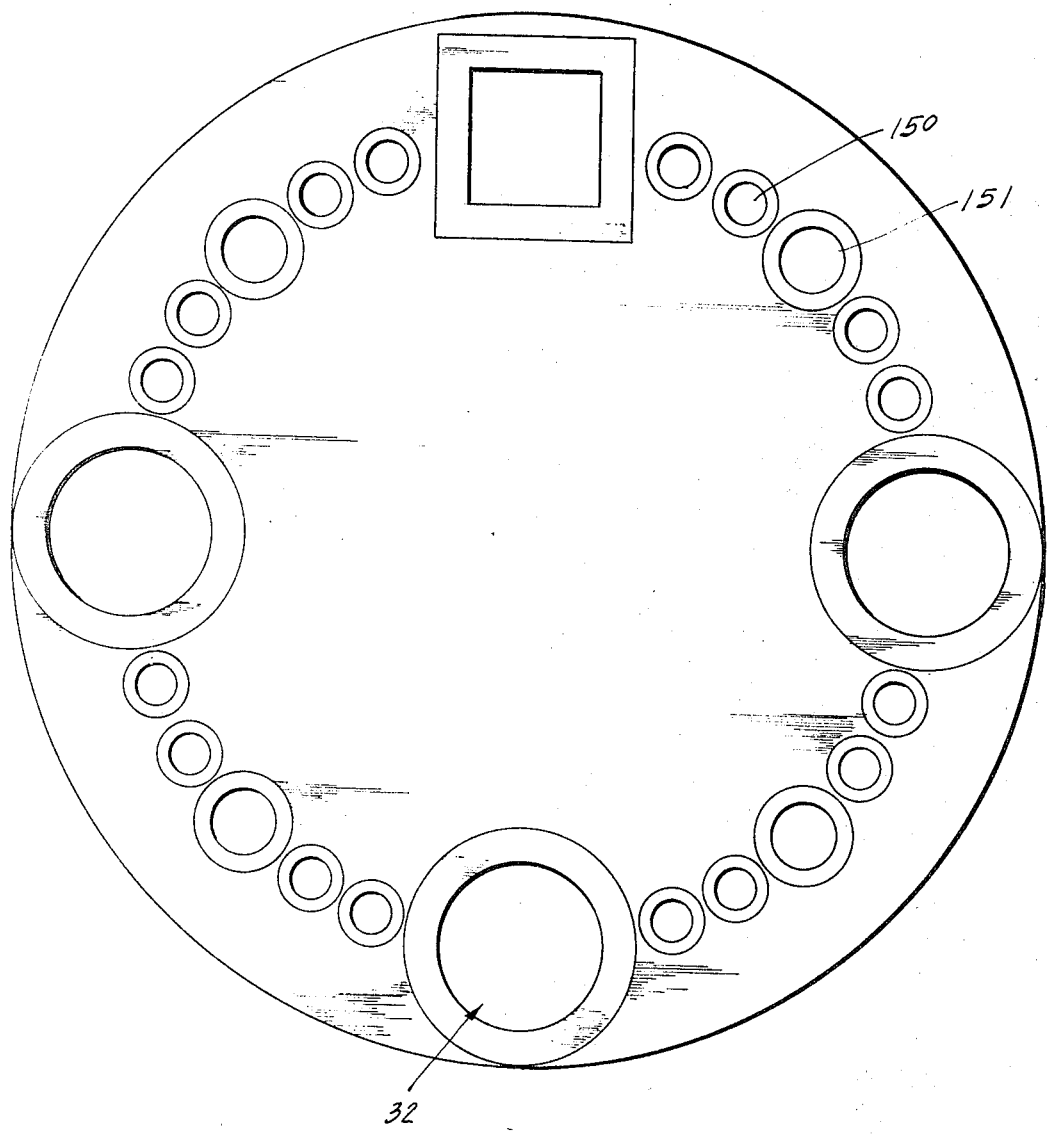

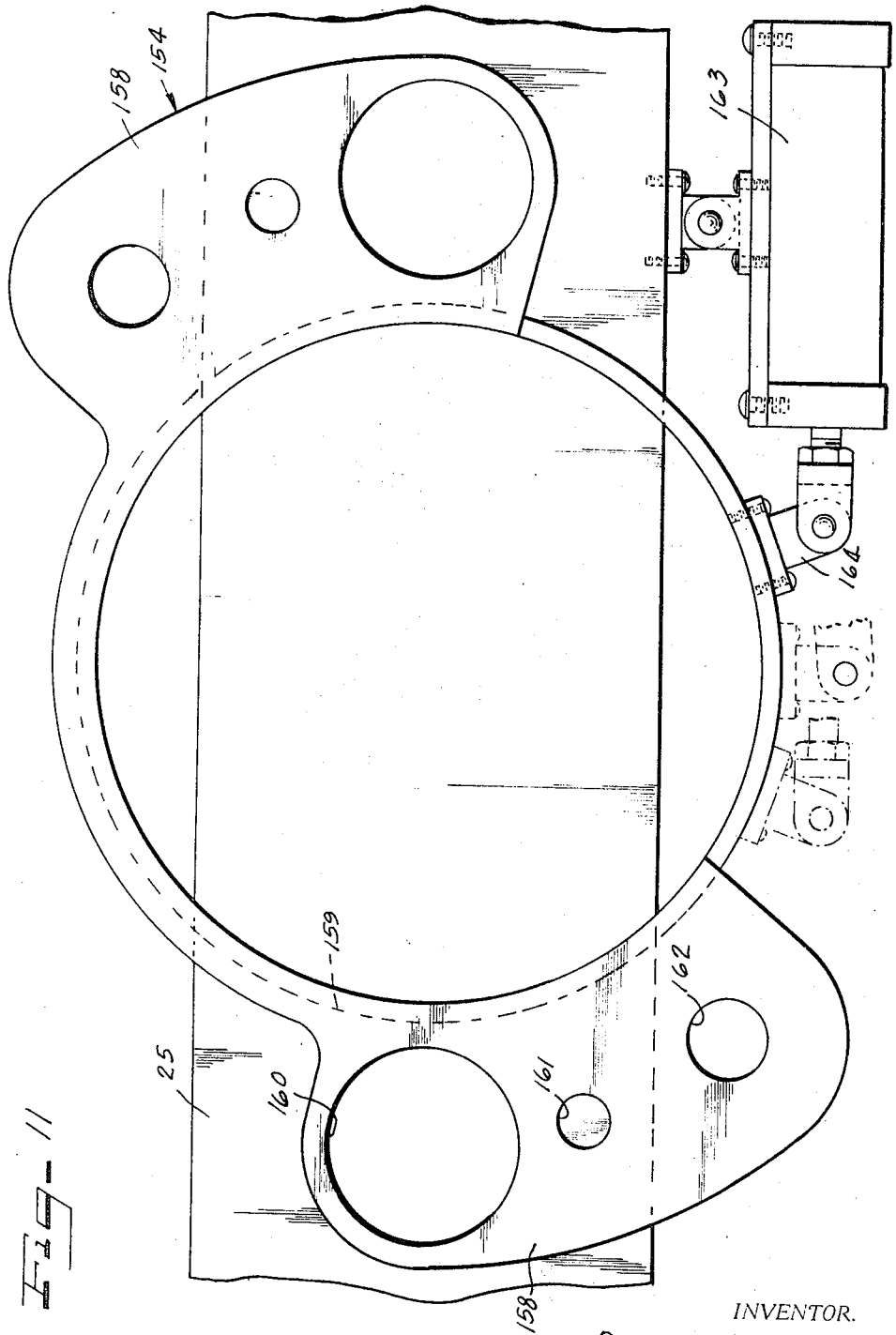

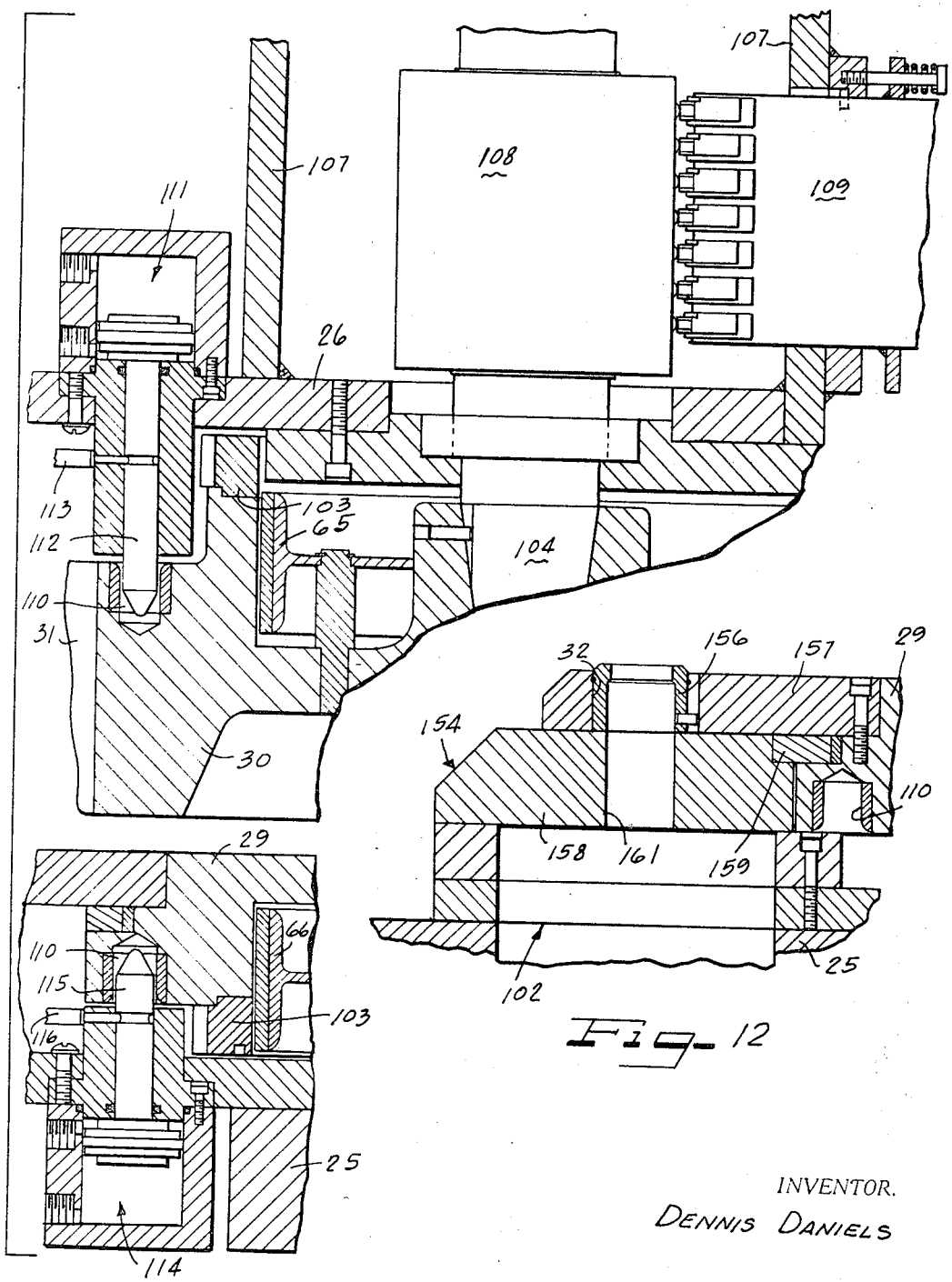

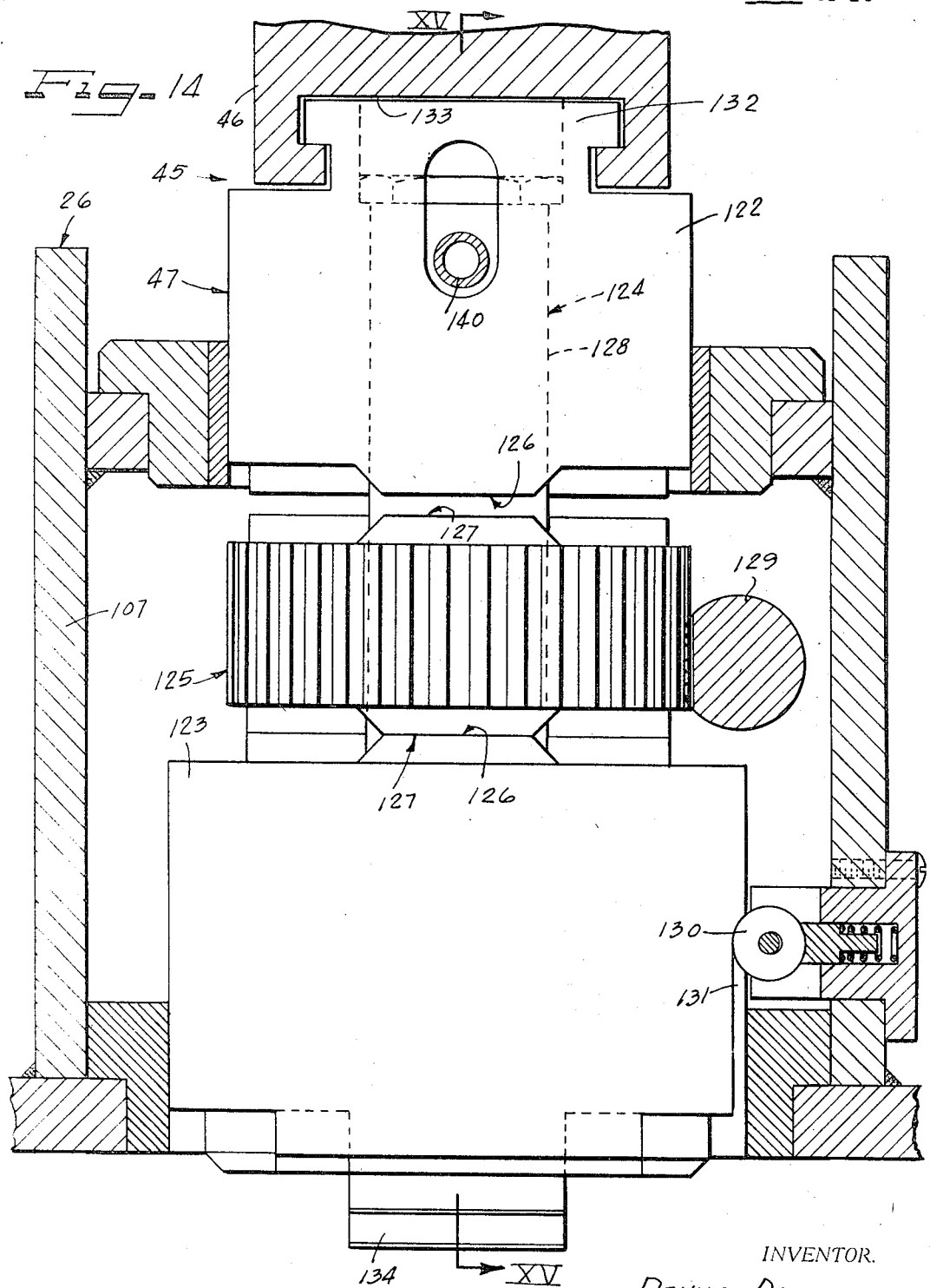

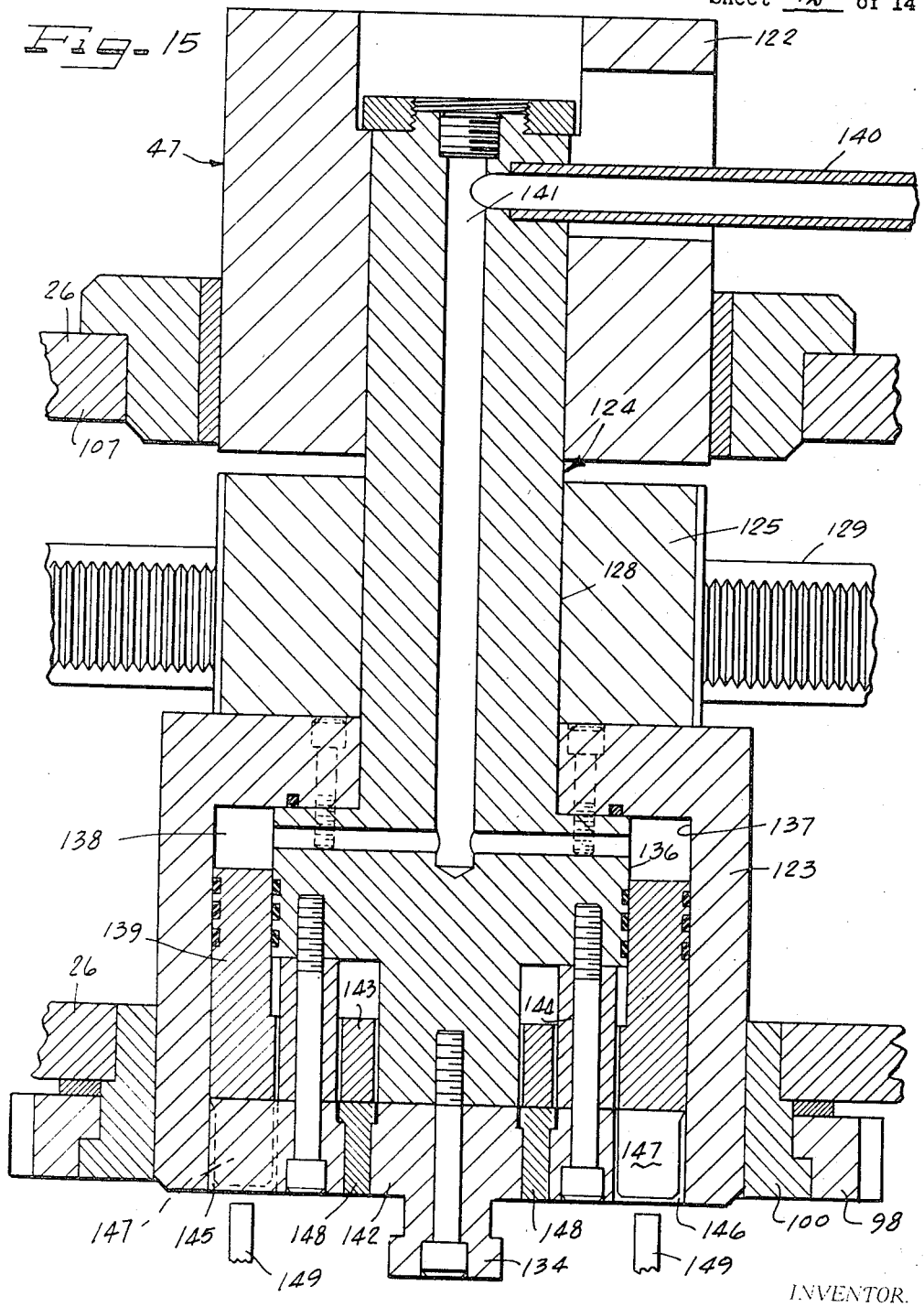

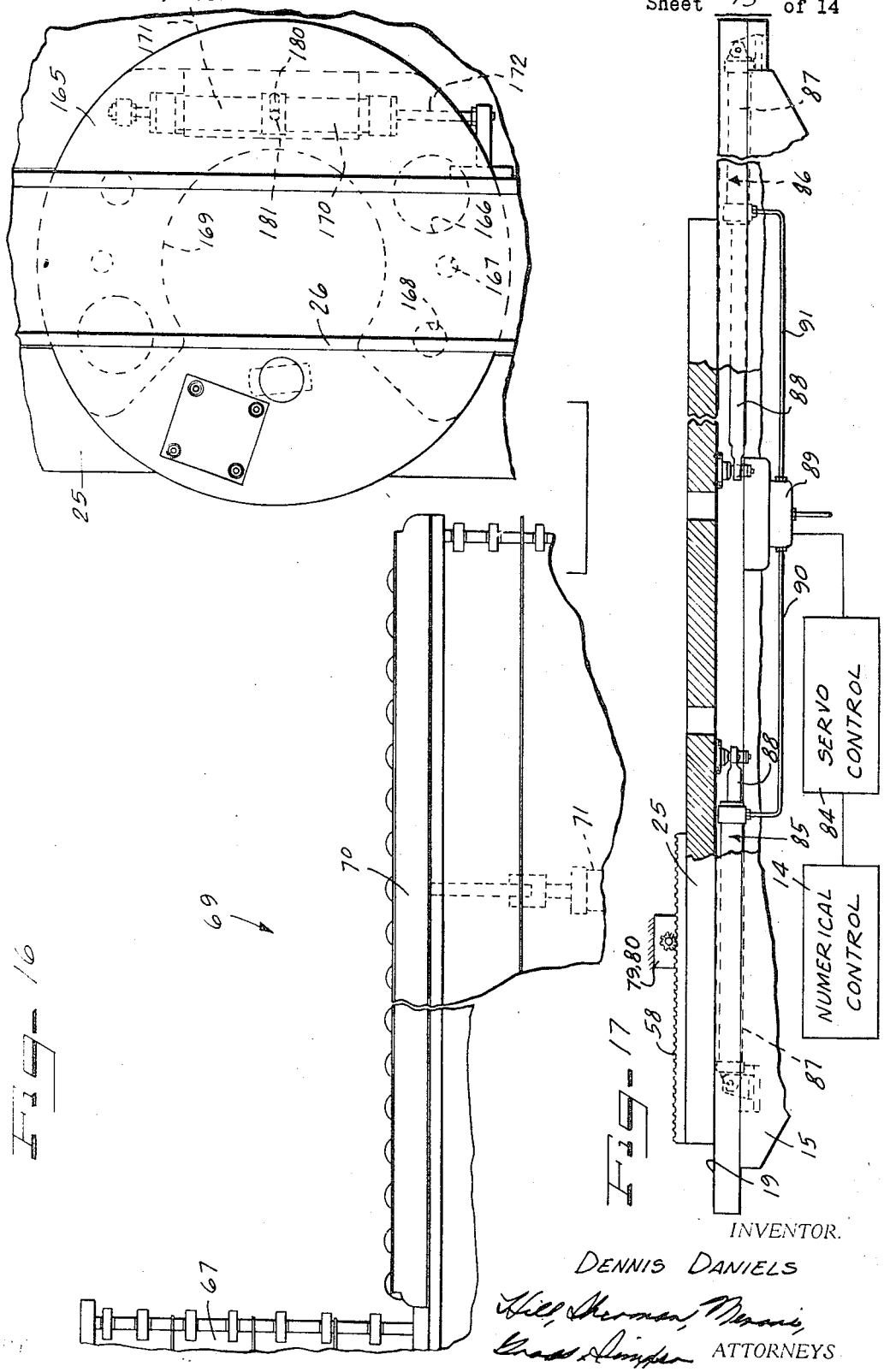

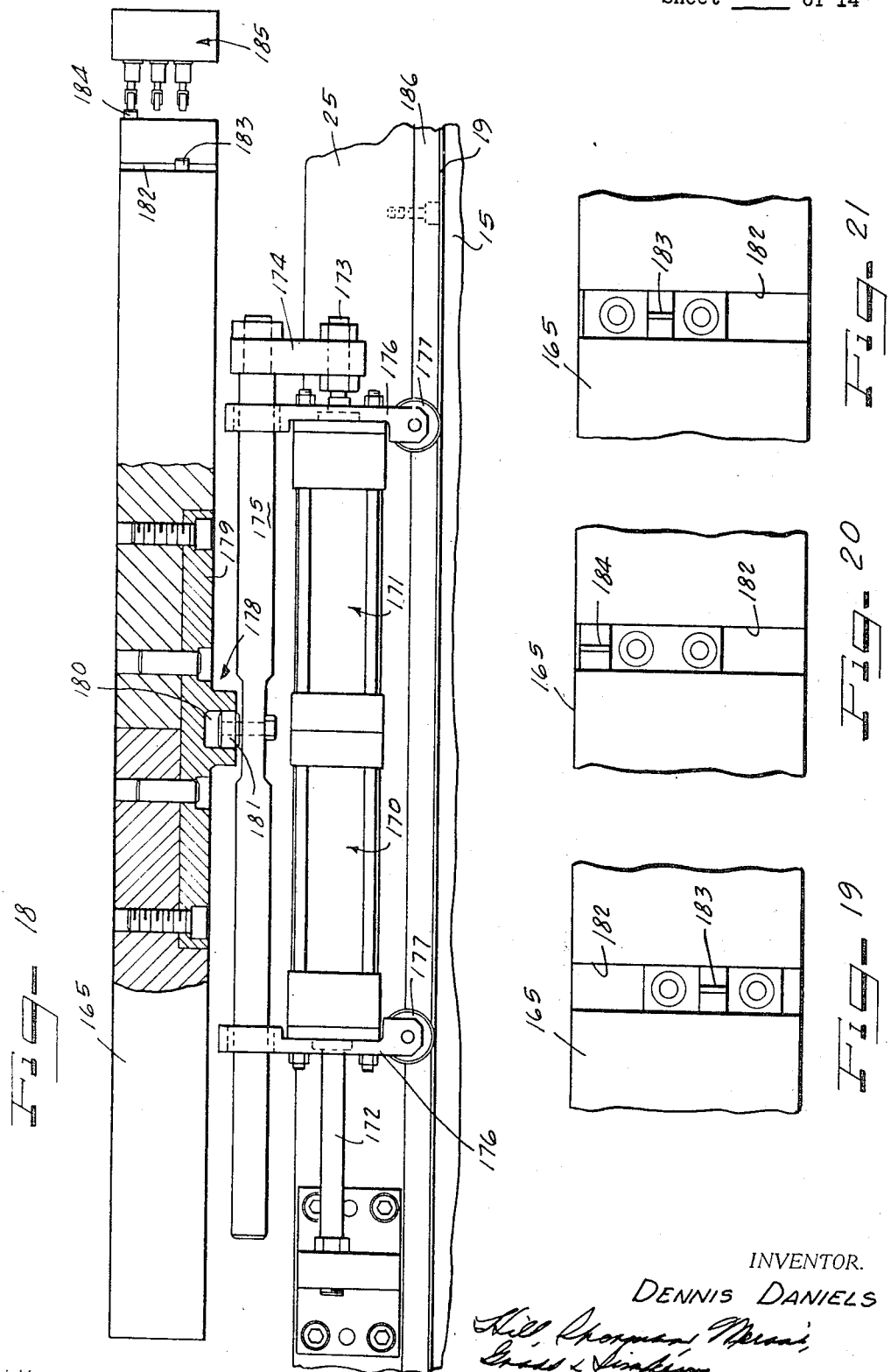

United States Patent Office 3,449,991
Patented June 17, 1969

3,449,991
PUNCH PRESS
Dennis Daniels, 122 Berkley Road,
Williamsville, N.Y. 11211
Continuation-in-part of application Ser. No. 528,856,
Feb. 21, 1966. This application Feb. 6, 1967, Ser.
No. 629,335
Int. Cl. B26d 5/30, 7/06, 5/12
U.S. Cl. 83—71      61 Claims

ABSTRACT OF THE DISCLOSURE

A numerically controlled punching machine feeds the workpiece in the X-axis over a stationary base, the base also supporting a D-shaped frame for movement in the Y-axis. The frame rotatably supports a pair of tool turrets between which the workpiece is passed. The turrets are power driven and employ tooling of more than one envelope size. The base supports a driven ram which is connected to two ram assemblies aligned with diametrically opposite turret stations, only one ram assembly being actuatable at a time. A tool loader simultaneously loads both punch and die tooling in the turrets. A power-driven bolster allows for use of a number of dies having various outside diameters. The ram assemblies have fluid-pressurized means for actuating a stripping element associated with the punch.

RELATED APPLICATIONS

This application is a continuation-in-part of my application for U.S. Patent on a "Punch Press," filed Feb. 21, 1966, Ser. No. 528,856 and now abandoned.

BACKGROUND OF THE INVENTION

Field of the invention

This invention relates to the structure employed in a heavy-duty punch press of the type that is adapted to be numerically controlled, and more specifically is directed to a punch press of the turret type.

Prior art

Punching machines as known in the past, particularly of the numerically controlled type, have involved principles of construction which have created special problems in connection with enlargement of the geometrical size and tonnage capacity thereof. It has been conventional to employ a frame having a C-shaped configuration. Such a press exerts maximum reactive forces between the arms of the C-frame at the moment of breakthrough in the workpiece, and as the required punching force is increased, the tendency for the arms to spread and to cause slight tooling misalignment has increased to the detriment of the quality of punching. As the size of workpiece to be handled is increased, the throat depth of such presses must be increased and such increase in arm length has increased the tendency for the arms to spread during punching. With a substantial increase in both tonnage capacity and workpiece size, extremely heavy massive components would be required to perform a particular job. Moreover, as punching operations must be located anywhere within the limits of a workpiece, not only must the machine be at least twice as long as the workpiece, but it must be at least twice as wide as the workpiece. Allowing for hardware that makes up the machine, a typical prior machine must have a dimension in the Y-axis which is three times as great as the Y-dimension of the workpiece. When the machine is made to accommodate a large area workpiece, the amount of floor space required is likewise greatly increased. Further, as the workpiece gets large, it becomes extremely inconvenient if not impossible to load into machines of conventional arrangement owing to human limitations. Further, in order to provide maximum flexibility for a machine of this type, it must be possible to provide in the turret a large selection of ready tooling. As the complexity of parts to be manufactured is increased, and as such complexity is varied from part to part, no matter how large a turret would be made, it would still never have an adequate number of available tools. Moreover, as the turret size is increased, the time required to bring the most remote tooling to the punching station is greatly increased.

SUMMARY OF THE INVENTION

The punch press of the present invention uses a pair of turrets to guide the tooling, the turrets being carried by a frame which merely guides the ram means, the ram means being supported entirely by a base so that any yielding or "breathing" of the structure that supports the ram means has no effect on the alignment of the tools carried by the turrets. Preferably, two alternatively operable ram assemblies are provided to act on opposite sides of the turret so that the Y-axis movement of the press needs to be only half as large as the width of the workpiece, thereby greatly reducing mass and floor space requirements for a given tonnage capacity, and also decreasing the maximum time taken by a turret to position selected tooling in an operating position. Means for replacing the tooling in the turrets rapidly increases the effective size of the turrets to the user. Means are provided for enabling the use of tooling having various envelope sizes, and the punch ram is constructed to utilize fluid pressures to effect stripping of the workpiece from the punch.

Accordingly, it is an object of the present invention to provide a punch press which is capable of operating with precision and accuracy as to hole formation and hole location in relatively large workpieces.

A further object of the present invention is to provide a punch press which will perform its various control functions rapidly so as to enable a high speed or production.

Yet another object of the present invention is to provide a punch press constructed to provide a high-speed of tool selection and/or substitution.

A still further object of the present invention is to provide a punch press wherein the workpiece is moved in only one axis, such as the X-axis, thereby enabling the punch press to handle either sheets or coil stock.

Yet another object of the present invention is to provide an arrangement by which a minimum of floor space is utilized for the size of workpiece to be handled.

Another object of the present invention is to provide a press having a higher tonnage capacity than would be expected from the amount of material used therein and the floor space occupied by the same.

A still further object of the present invention is to provide a punch press structure which can be conveniently loaded from several positions.

Many other advantages, novel features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 2 is a perspective view of the punch press of FIG.

Figure 1:
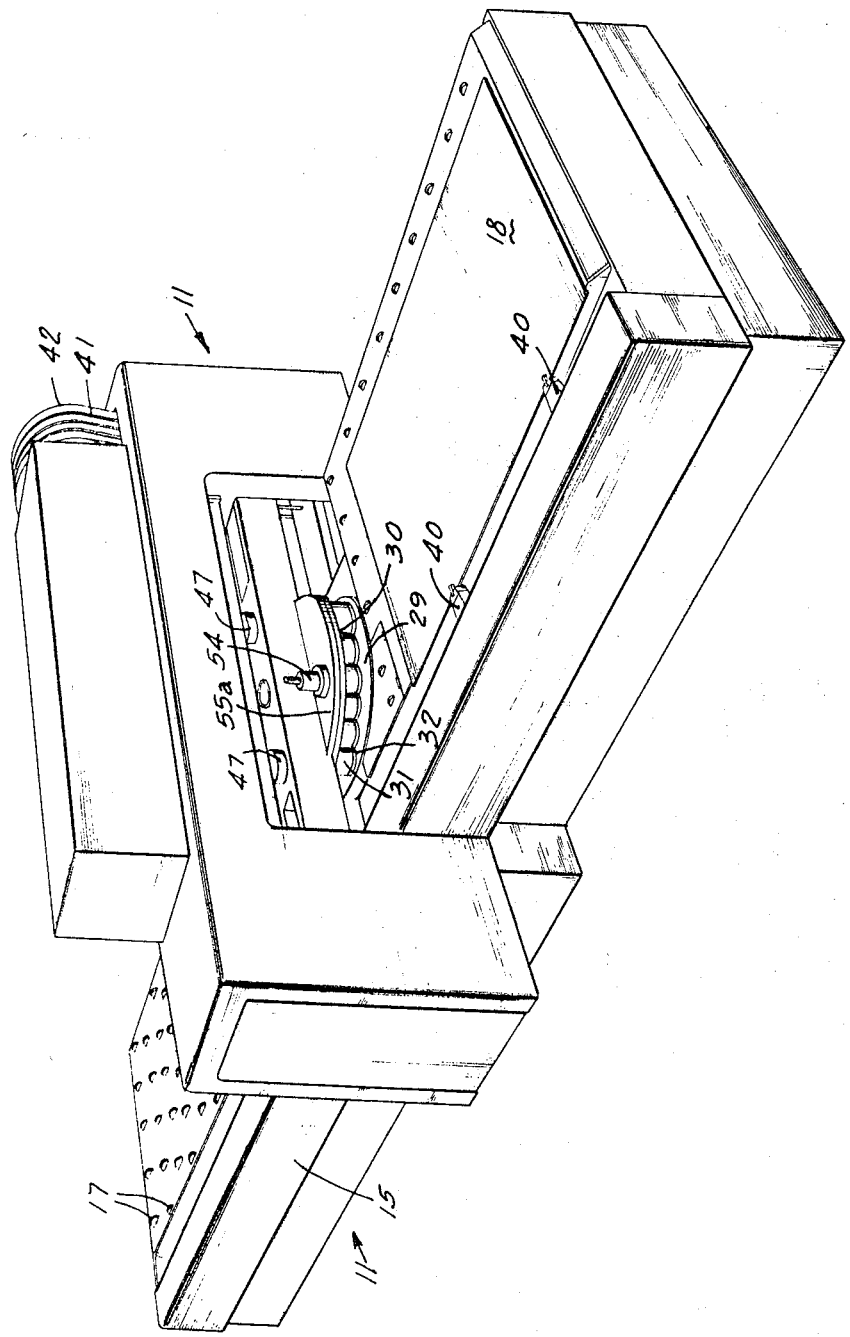
FIG. 1 is a perspective view of an automatic punch press constructed in accordance with the principles of the present invention.
Figure 4:
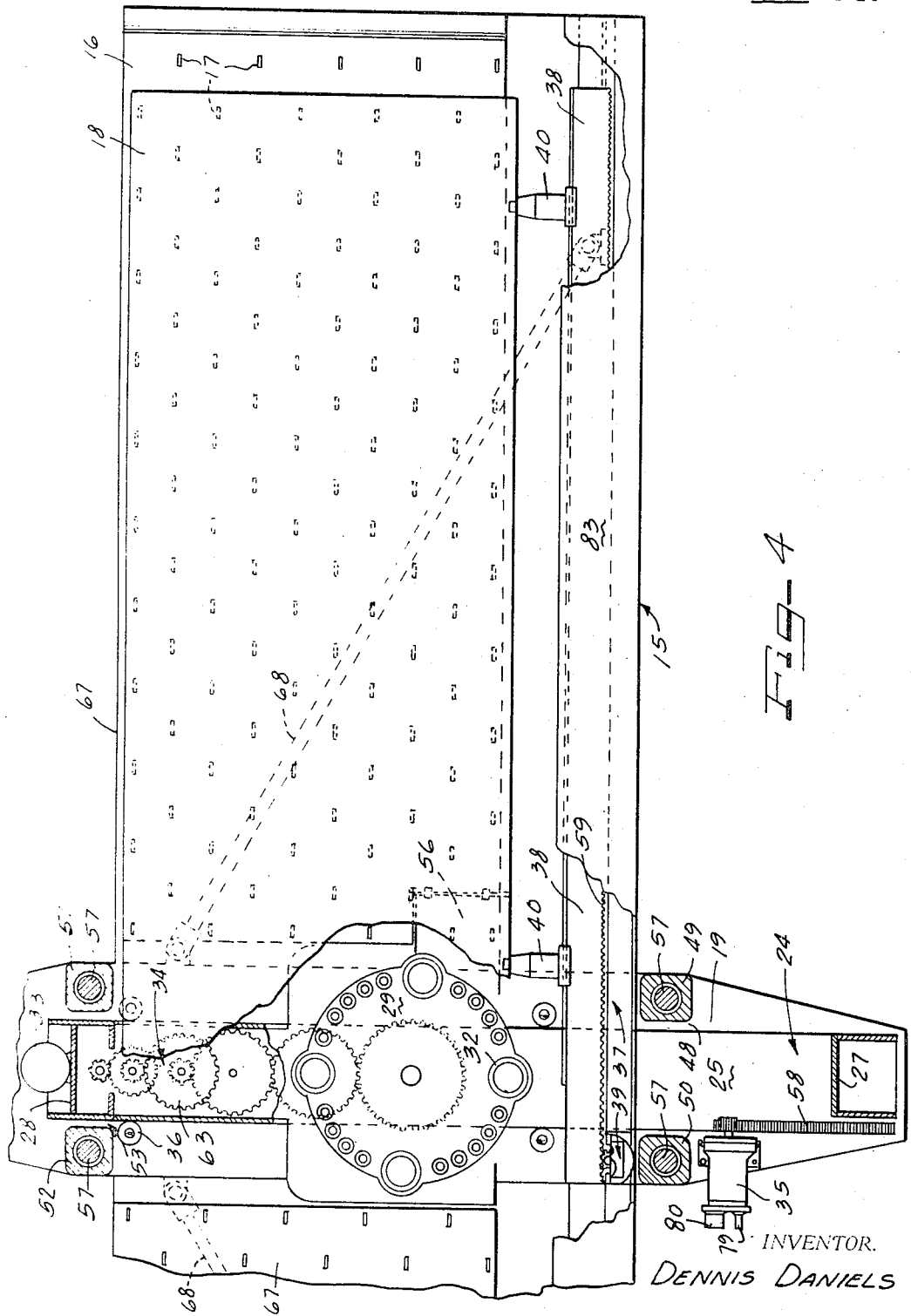

1 wherein certain shrouds and covers have been removed;

FIG. 3 is a perspective-diagrammatic view of the entire machine of FIG. 1;

FIG. 4 is a fragmentary top view of the punch press as shown in FIG. 2, with parts broken away and cross-sectioned;

FIG. 5 is an enlarged fragmentary vertical cross-sectional view illustrating a X-axis positioning mechanism;

FIG. 6 is an enlarged view of a portion of FIG. 5 enclosed within a circle VI;

FIG. 7 is an end view of the punch press with parts broken away and others shown in cross section;

FIG. 8 is an enlarged view of a portion of FIG. 7 and shown in vertical cross section, illustrating the turrets, their rams and their angular drive means;

FIGS. 9 and 10 are enlarged diagrammatic views showing tool arrangements which are alternate to that shown in FIG. 4;

FIG. 11 is a top view of an adjustable die bolster wherein other parts have been omitted for clarity of illustration;

FIG. 12 is a fragmentary cross-sectional view taken through a portion of the die bolster of FIG. 11 showing coacting elements;

FIG. 13 is a fragmentary cross-sectional view taken through the turrets showing shot pin structure cooperating with the turrets;

FIG. 14 is an enlarged cross-sectional view taken along line XIV—XIV of FIG. 8 illustrating one of the ram assemblies;

FIG. 15 is a cross-sectional view taken along line XV—XV of FIG. 14, but of the other ram assembly;

FIG. 16 is a fragmentary top view of the punch press showing an alternate location for the tool loader, and a modified form of adjustable bolster;

FIG. 17 is a view of a fragmentary portion of FIG. 7 showing a modified Y-axis drive;

FIG. 18 is an end view of the bolster shown in FIG. 16 illustrating its drive; and FIGS. 19–21 are enlarged fragmentary views of portions of the bolster shown in FIG. 18 illustrating binary switching.

General description of structure

The principles of this invention are particularly useful when embodied in a punch press or punching machine such as illustrated in FIG. 3, generally indicated by the numeral 10. The automatic punch press 10 includes a punching machine 11 which is provided with workpiece cut-off means or a cut-off machine 12, a workpiece feeder 13, and a numerical control means 14.

The workpiece cut-off means 12 is of conventional construction, and is disposed adjacent to one end of the base of the punching machine 11 for acting on the workpiece. The workpiece feeder 13 is disposed adjacent to the punching machine for placing workpieces on the machine to enable punching operations to be made thereon. The workpiece feeder itself is of conventional construction. The numerical control means 14 is likewise of conventional construction. However, a novel aspect of the present invention is that the numerical control means 14 not only controls the punching machine 11, but also controls operation of the cut-off machine 12 and the workpiece feeder 13 to provide a completely integrated or synchronized device. The numerical control means 14 in positioning a workpiece on the punching machine 11 also inherently positions the workpiece in a precise predetermined place for precise control of the point on the workpiece at which the cut-off means is to act.

The punching machine or punch press 11 is seen in perspective in FIG. 1, and for the purpose of this specification, is better seen in FIG. 2 which illustrates the punch press 11 with certain shrouds and covers removed, thereby revealing in a better manner the actual structure of the machine or press 11.

The base

The punch press 11 includes a fixed table or base 15 which is adapted on its upper surface as at 16 to support a workpiece at work bench height. The workpiece support surface 16 is provided with a number of rollers 17 throughout its extent against which a workpiece 18 actually engages. The length of the base 15 is substantially twice the length of the longest workpiece that can be handled without regrasping of the workpiece, and the effective width of the fixed table or base 15 is substantially the same as the maximum width of workpiece 18 that can be handled. The workpiece 18 moves linearly by means described below while supported by the rollers 17, such movement being referred to herein as movement in the X-axis. The workpiece 18 is not moved in the Y-axis during repositioning thereof.

The base 15 further includes a transversely extending support surface 19 which projects from opposite sides of the base 15, and which is downwardly recessed from the plane in which the workpiece 18 is moved. From the support surface 19, there extends upwardly, at opposite sides of the base 15, a number of upwardly extending portions generally indicated by the numerals 20, 21. The upwardly extending portions 20 and 21 in a sense comprise straight sides of the press 11, between which sides the workpiece 18 is fed for passing therethrough.

The base 15 further includes a span structure generally indicated at 22 which is supported by the upwardly extending portions 20, 21, which connects them together to define a rigid structure. The spanning structure 22 is held to the lower portion of the base 15 by means of four tie rods or elongated bolts 57 (FIGS. 4 and 7) which thread into larger nuts 23 at their upper end, and into similar nuts 23 at their lower ends.

The movable frame and turrets

The recessed transverse support or slide surface 19 slidably supports a frame or bridge generally indicated at 24 which includes a pair of spaced arms 25, 26 which are rigidly joined together at their opposite ends as at 27, 28. The lower arm 25 in a broad sense is a movable bolster. The arms 25, 26 respectively support a pair of turrets 29, 30. The turret 29 is rotatably supported on the lower arm 25, and the upper turret 30 is rotatably supported on the upper arm 26. The turrets 29 and 30 are each provided with a like number of stations or means for supporting cooperative tooling. The turrets 29, 30 are thus supported between the arms 25, 26, are supported by such arms, and their rotational axes coincide. However, the turrets 29, 30 are spaced from each other so that the workpiece 18 can pass therebetween, and the punch and die tooling carried by the turrets 29, 30 is engageable with opposite sides of the workpiece.

The punch and die tooling used in the turrets 29, 30 can be of conventional construction and is received in the nests or stations by a slip fit, coupled with suitable detent means or the equivalent to hold the same vertically in place. Typically, the tooling is that provided to enable punching of holes in the workpiece 18 or to enable the cutting of notches therein. The upper turret 30 has a number of tooling stations such as illustrated at 31 while the lower turret 29 has a number of die-receiving stations 32. The turrets 29, 30 thus comprise a rotary tool index whose rotational axis is fixed with respect to the frame or bridge 24, but such pair of turrets 29, 30 is movable in the Y-axis only in response to displacement of the frame 24 on the support surface 19.

In order to rotate the turrets 29, 30 there is provided motor means 33, here comprising a single motor, which drives connecting means 34 leading to both turrets 29, 30, described below in greater detail and best shown in FIG. 8. The connecting means 34 thus drivably couples the motor means 33 to the pair of turrets. In order to obtain high-speed operation, the motor means 33 comprises a single motor which normally runs continually, and the connecting means 34 comprises or includes selectively alternately actuatable clutch 64 and brake means 65, 66 (FIG. 8). In this manner, the turrets are either locked by such brake means 65, 66 against rotation, are substantially instantaneously accelerated into a high speed rotational movement, and are substantially instantaneously decelerated to a standstill upon completion of the proper degree of rotation. To facilitate the passing of the workpiece between the turrets 29, 30, the connecting means 34 preferably comprises two separate branches 62, 63, each of which branches is here a series of gears. If desired, the motor 33, clutch 64 and brake 65, 66 may be replaced by a suitable conventional servo motor connected to the gear-type connecting means 34.

In order to move the bridge or frame 24 in the Y-axis, there is provided a motor 35 which acts between the base 15 and the frame 24. In this instance, the motor 35 comprises a hydraulic servo motor on which there is provided a precision-made pinion which coacts with a precision-made rack 58 (FIG. 4) on the lower arm 25. A number of guidance means 36 are provided at the upwardly extending portions 20, 21 which guidance means 36 engage the frame 24, and in particular which constitute rollers which engage the lateral sides of the lower arm 25 thereof.

In order to move the workpiece 18 in the X-axis, there is provided means generally indicated at 37 secured to or carried by the base 15 for moving the workpiece, such movement being in a direction transverse to the movement of the frame 24, and parallel to the plane of the workpiece 18. The means 37 include an elongated rigid member, an end of which is visible at 38, which extends for approximately one-half the length of the base 15. The elongated rigid member 38 is shown in a retracted position in FIG. 2 which is as far to the right as it can move, and its other end is drivably engaged by a motor 39 carried by the base 15, the motor 39 also comprising a hydraulic servo that is provided with a precision pinion acting on a precision rack 59 (FIG. 4), the rack forming part of the elongated member 38. Secured to the elongated rigid member 38 is a pair of hydraulically actuated clamp means 40 which grasp the adjacent edge of the workpiece 18.

The ram structure

When the workpiece 18 has been positioned in the X-axis by the positioning means 37, when the turrets 29, 30 have been rotated to place the selected tooling stations 31, 32 in operating position, when the frame 24 has been driven by the motor 35 to place the selected tooling stations 31, 32 in the proper position in the Y-axis, the workpiece 18 is then ready for being punched. To effect relative reciprocation of the selected tooling carried by the turrets 29, 30, there is provided a ram motor which is not illustrated, which drives a number of belts 41 which extend about an enlarged pulley-type flywheel 42. If desired, such motor could be disposed on the span structure 22 with the belts 41 extending upwardly (FIG. 7). The flywheel 42 rotates continually and includes a conventional remotely controlled clutch 60 for transmitting the dynamic energy to a shaft 43 that is also provided with a brake 44. The shaft 43 is provided with suitable eccentrics 61 to operate ram means generally indicated at 45. The shaft 43 preferably carries the flywheel at the end more remote from the operator's station.

The ram means 45 include a driven ram 46 which is slidably supported at its ends by the upwardly extending portions 20, 21 of the base 15. The ram means 45 further includes at least one ram assembly 47, and preferably includes two such ram assemblies 47 as shown. The ram assemblies 47 are slidably guided by the upper arm 26 of the frame 24, and are spaced apart so as to register with diametrically opposite tooling stations on the turrets 29, 30. Thus the ram assemblies 47 move in the Y-axis with the frame 24. The weight of the ram means 45 is entirely supported by the base 15, while being only slidably guided by the frame 24. Each of the ram assemblies 47 is alternatively operable by means of internal structure described below which can be selectively actuated so that the driven ram 46 will transmit power only to one of such ram assemblies 47, whereby only the tooling at one of the diametrically opposite tooling stations is actuated. This structure gives the press 11, in effect, two punching stations, each of which has a "zero" position, and which are offset in the Y-axis from each other. The punching stations are thus located 180° apart on the turrets, a feature which lessens the amount of rotation which the turrets 29, 30 will need to pass through, and lessens the amount of Y-axis travel that the frame will have to pass through in providing a selected pattern on the workpiece 18. This feature enables the amount of Y-axis travel of the frame 24 to be substantially only one-half of the maximum width of the workpiece that can be accommodated by the press 11.

General operation

On actuation of the clutch 60 within the flywheel 42 and release of the brake 44, energy thus is transmitted by the driven ram 45 to the selected one of the ram assemblies 47 to actuate the selected aligned tooling in the stations 31, 32. The tooling in the lower station 32 is supported by apertured slug-receiving means in the nature of an adjustable bolster or bolster section, described below, within the bolster or lower arm 25, and the upper tooling is merely guided by the structure described. Therefore, there is no tendency for the structure which holds and guides the tooling to yield in any manner, whereby the axes of the cooperating tools remain angularly coincidental throughout the extent of the punching stroke. This feature thus avoids "breathing" of the press throat as is typical in certain prior machines. The connecting means 27 are thus located on opposite sides of the tooling support means 29, 30 and these portions thus assist in the elimination of "breathing" and in the continual maintenance of tool aligment or concentricity.

The upwardly extending means 20, 21 are provided with a first space or aperture 48 through which the frame 24 passes, the frame 24 thus being straddled by four leg-like portions 49–52. Each of the legs 49–52 thus has a first space at one side of it through which the frame 24 extends, and a second space 53 on another side of it for receiving the workpiece between it and an adjacent leg. The upwardly extending portions 20, 21 of the frame 15 are thus disposed also at opposite sides of the tool-support means 29, 30 and overlie the frame 24 so that the frame end can pass through adjacent end portions of the base 15. The portions 20, 21 thus also jointly support at least part of the ram means 45.

By means of the structure of the base 15 described, the workpiece 18 is afforded full and continuous support.

Tool loading

Means are provided for loading and unloading the cooperative tooling into the turrets 29, 30. To this end, there is provided a tooling ejector 54 which is carried on a bracket 55a secured to the frame 24 so that the tooling ejector 54 is disposed adjacent to the turrets 29, 30, and more specifically adjacent to the upper turret 30 at one of its work stations which is angularly remote from the ram assemblies 47, 47. The size of the opening in the lower turret 29 which receives the lower portion of the tooling, such as the die, is made larger than the corresponding opening in the station of the turret 30 directly thereabove. The tool ejector 54 is in the nature of a remotely actuatable plunger which engages the slidably held tooling in the upper turret 30, forcing it out of position and into nesting engagement with the lower tooling, the tooling ejector 54 being further operative thus to force all such tooling out through the lower dial or turret 29 into a suitable nest or the like immediately below the lower turret 29.

Similarly, there is provided below the lower turret 29, a tooling loader 55 which is carried by means that are carried by the base 15. The tooling loader 55 is disposed adjacent to the lower turret 29 in alignment with one station that is remote from the ram assemblies 47, 47. The tooling loader is in the nature of a plunger that has a nest at its upper end which forces the tooling upwardly through the larger opening in the lower turret 29 so that the tooling for the upper turret passes therethrough and is received in the station thereabove. It is to be understood that in certain embodiments, the tool ejector 54 and the tooling loader 55 may be angularly offset from each other to operate at separate stations. However, when they are aligned as shown, the tooling loader may serve as the receiving nest for accepting tooling ejected by the tooling ejector 54. The space beneath the lower turret is sufficiently large to perform these functions by hand if desired, and access to such space is obtained by pivoting a cover or door 56 which is shown in the open position in FIG. 2 and in the closed position in FIG. 1.

During all of the handling of the tooling described, namely during loading and unloading or ejecting, the punch is in nesting relation to the die opening, thereby rendering it impossible where a non-circular tooling is employed, to angularly misalign one of the tools with respect to the other.

Controls

Although any of the functions and controls described can be sequenced or operated by hand, it is preferred to employ the numerical control means 14 described. Use of the numerical control means 14 enables many of the controls to be simultaneously actuated. For instance, the workpiece 18 may be moved in the X-axis while the frame 24 is being moved in the Y-axis while the turrets 29, 30 are being rotated. Also, simultaneously therewith, the controls for the zero-offset feature, namely the control for selecting which of the ram assemblies 47 shall be operative, may also then be operated concurrently with the aforesaid group of functions.

The numerical control machine may operate the cutoff means 12 at the same time it is calling for operation of the driven ram 46. The control of the workpiece feeder 13 and of the workpiece clamps 40 would necessarily precede the foregoing functions.

The foregoing structure is particularly advantageous in that there is no table that is moved in the X-axis, thereby minimizing the amount of mass and hence the inertia problems inherent in table movement, a fact which facilitates the obtaining of maximum positioning accuracy.

FURTHER BASE DETAILS

The base 15 is considered large, extending for about ten feet from either side of the frame support member 19. To facilitate the fabrication thereof, the base is made in portions or sections wherein a table portion 67 extends horizontally from the frame support member 19, and a second table portion 67 extends similarly in the opposite direction. The table portions 67 support the workpiece moving means and also fully underlie the workpiece 18. A pair of connecting means illustrated schematically at 68, 68 in FIG. 4, are each connected between one of the table portions 67 and the frame support member 19 and provide means to adjust the squareness between the direction that the frame 24 is movable, with respect to the direction that the workpiece 18 is movable. If desired, and if suitable anchoring were utilized, either one of the table portions 67 could be constructed to be ahead of the transverse support member 19.

While the location shown in FIG. 2 for the loader 55 is advantageous, certain advantages are obtained by locating it in a position diametrically on the opposite side of the turrets 29, 30. Having this location for the loader 55 in mind, and as shown in FIG. 16, the base 15 is advantageously provided with a laterally directed opening 69 which is relatively large and which is clear of all obstructions so as to enable personnel, wheeled carts, or the like to move in readily to a position adjacent the turrets, and more particularly in a position adjacent to the loader. The table portion 67 of the base 15 having the opening 69 is provided with a pivotable base section or flap 70 which normally closes the opening 69 so that it may support the workpiece. The base section 70 is illustrated in a retracted or open position and has a power actuator 71 for reciprocating the base section 70 as required.

X-axis mechanism

The linear extent of the workpiece moving mechanism 37 and the elongated rigid member 38 is shown in FIG. 4, while other details associated therewith are best seen in FIGS. 5 and 6. This mechanism has two functions, one of which is to reciprocate the workpiece in a longitudinal direction referred to as the X-axis, and the other function is to provide a reference surface so that when the workpiece 18 is loaded into the machine by being moved such as manually in the Y-axis to engage the clamps 40, the extent of such movement is predetermined and fixed in part indirectly by the rigid member 38. The elongated rigid member or gib 38 is provided with a series of individually adjustable rollers which support and guide such member 38, such rollers being indicated at 72, 73. As shown in FIG. 5, the base 15 includes a rigid bracket or supporting portion having a generally C-shaped configuration within which the rigid member 38 is disposed and by which the rollers 72, 73 are carried. In view of the fact that the rigid member 38 has a typical length of 11 feet for handling a 10-foot workpiece, the roller structure illustrated and described is repeated incrementally throughout the more than 20-foot extent of the base 15 so that as the rigid member 38 is reciprocated, it is similarly guided and supported for all positions. The rollers 72 are carried on eccentric pins 74 which are rotatably or adjustably supported in horizontal positions above and below the rigid member 38, each having a slot to facilitate rotation, and a set screw for locking a selected position. The rigid member has a downwardly directed groove 75 extending throughout its length within which the rollers 73 are disposed, successive rollers 73 engaging opposite sides of the groove 75. Each roller 73 is carried by an eccentric pin 76 which is keyed to a pin cap that is locked to the base 15.

The rigid member 38 is a rack which has the teeth 59 which is reciprocated by the motor 38, and to this end, the motor 39 has a pinion 77 keyed thereto and disposed in mesh with the teeth 59 which preferably are of the wedging type. Only a single rack and a single pinion is employed, such pinion 77 being carried at one end of the shaft of the motor 39. At the opposite end of such shaft, there is disposed a gear 78 which coacts with the input gear of a velocity signal generator 79 and also with the input gear of a position indicator or transducer such as of the pulse type, indicated at 80. Thus only the one rack 59 which meshes with only one pinion is employed for the purpose of moving the workpiece, sensing its velocity of movement, and reading its position. The velocity generator 79 and the position indicator 80 are conventional components, and similar components are employed in the Y-axis drive.

The manufacture of the rigid member 38 with the rack 59 thereon entails certain problems. The rigid member 38 is first ground to a suitable finish and flatness, and thereafter the teeth of the rack 59 are hobbed. To provide wear resistance at the point where the various rollers 72, 73 engage the rigid member 38, it would be possible under prior practice to provide thick hardened strips to be secured to the rigid member 38 as by screws, coupled with grinding of such strips if necessary. This structural arrangement uses a considerable amount of material and space and entails the reciprocation of a considerable mass. The structure disclosed and described below uses somewhat less material and less space, and yet is of such construction as to remain straight and wear resistant throughout its length. It is therefore preferred that there be applied a film of synthetic adhesive illustrated in enlarged form for clarity at 81 to which there is applied a hard ground strip of flexible tool steel such as that from which band saw blades are made (but without teeth). This also could be ground if needed. A typical thickness of this strip is .020″, and its width is up to ½ inch. A screw (not shown) may be used at each end to prevent delaminating.

There are many adhesives that will not stick. Also, liquid or paste adhesives would provide a variable thickness, and either usually would not stick or would need heat curing. Such heat curing could be expected to damage the straightness of the rigid member 38. It is therefore preferred that the film 81 of synthetic adhesive comprise a dry removal adhesive transfer tape, which is a film of tape which is pressure sensitive or tacky on both sides. Examples of suitable material include that sold by Minnesota Mining & Manufacturing Co. as No. 465 and as No. 466 pressure sensitive film. One such strip of flexible tool steel 82 is embedded in a slight recess in the rigid member 38 at each of opposite sides of the groove 75, at each of opposite sides of the lower surface, and at each of opposite sides of the upper surface.

Preferably, a guard 83 overhangs the mechanism just described.

The motor 39 has been illustrated in FIG. 2 in a location which is schematic, while the location in FIG. 4 is that which is preferred. The motor 39 may be made of such capacity as to enable the workpiece moving mechanism 37 to draw strip form of workpiece from a roll stand and through straightening rolls (not shown).

Y-axis drive

The motor 35 shown in FIGS. 2 and 4 cooperates with the rack 58 shown in FIG. 4, and includes a velocity sensing device and a position sensing device as explained in connection with the foregoing description of the X-axis mechanism, and as shown in FIG. 5. However, in the Y-axis, it is advantageous to employ a drive as shown in FIG. 17. In this instance, the rack 58 is used as an instrumentation rack and drives the velocity generator 79 and the position indicator 80 which are electrically connected to a servo control 84. Thus in the preferred embodiment, there is employed a pair of fluid actuators 85, 86, each of which has a cylinder 87 which is fixedly secured to the base 15, and a rod 88 which is secured to the frame 25. The numerical control 14 controls the servo control 84 which is connected to a servo valve 89 which forms part of a pressurized fluid system. The servo valve 89 has a line 90 leading to the rod end of the cylinder of the actuator 85, and a line 91 leading to the rod end of the cylinder of the actuator 86. Pressure is applied only to such rod ends, and is normally applied to both rod ends simultaneously, thereby placing both of the rods 88 in tension. As movement is called for in one direction, the servo valve 89 increases the pressure in one of the lines 90, 91 with respect to the other. The structure described has several advantages. The drive system for the frame, like the drive system for the workpiece positioning mechanism, employs only solid plumbing. Since the rods 88 are in tension at all times, factors such as backlash, yieldability and the like are completely cancelled. Since the rod ends are employed to be pressurized, the smallest possible volume of fluid is transferred for control purposes. The servo value 89 is so disposed that the lines 90 and 91 are equal in length and hence in volume, and therefore since the actuators 85 and 86 are identical, the performance in one direction in the Y-axis becomes identical to the performance in the opposite direction in the Y-axis. To facilitate this installation, the transverse support member 19 has a central slot within which the actuators are disposed, immediately adjacent to the lower surface of the frame 25. The central slot also serves to register with the slug chutes in the frame 25.

The arrangement of actuators 85, 86 described is thus particularly advantageous since there can be no functional looseness or backlash, since the same amount of hydraulic fluid is employed to move in both directions, since forces are applied in a centered and balanced manner, and since any compression of the hydraulic fluid due to its compressibility has no effect on the position ultimately attained.

Turret drive

Means for driving the turrets 29, 30 mentioned above in connection with FIG. 2 are illustrated more fully in FIG. 8. The connecting means 34 acting between the motor 33 and the turrets 29, 30 includes the upper branch of gearing 62 and the lower branch of gearing 63, both such branches being driven by a single shaft 92 connected to the clutch 64. The upper branch 62 is disposed at the lower side of the arm 26, and the lower branch 63 is disposed at the upper side of the arm 25. Each of the branches 62, 63 includes a pinion 93 driving a gear and pinion assembly 94 which drives a gear and pinion assembly 95 which drives a gear 96. To the upper gear 96, there is secured a centrifugal switch 97 which is normally closed, and which is used to sense a turret speed which is substantially zero. If there is no turret motion, the switch 97 moves to a closed position to close a shot pin circuit described below.

The upper gear 96 drives an upper ring gear 98, while the lower gear 96 drives a lower ring gear 99. The upper arm 26 supports a generally tubular or bushing-like bearing 100 which internally receives and guides the lower end of the ram assembly 47, the upper ring gear 98 being rotatably supported on the exterior of the bearing 100 so that the upper ring gear 98 encircles the axis of one of the ram assemblies 47. In a similar manner, the lower ring gear 99 is carried on the exterior of a bolster ring 101 which is disposed to transmit reactive forces between the arm 25 and the die, the ring being open at its center to define part of a slug chute 102. The ring gears 98, 99 respectively mesh with a pair of gears 103, 103 secured to the upper and lower turrets 30, 29. The upper turret 30 is rotatably supported on and keyed to a shaft 104 which is rotatably supported by bearings for rotation on the upper arm 26. Such bearings include thrust bearings, and the proper amount of thrust is obtained by employing a selected quantity of shims 105 beneath a cap 106 secured to a box portion 107 of the upper arm 26. The shaft 104 also supports a code drum 108 which is secured in a selected angular position with respect to the turrets to allow for such overtravel as the brakes 65, 66 etc. permit. A reading head 109 (shown in FIG. 13) coacts with binary coding carried on the external surface of the code drum 108 to signal the presence or coincidence of a selected turret station in alignment with a selected one of the ram assemblies 47. The reading 109 is provided with seven switches, six of which represent codes 1, 2, 4, 8, 10 and 20. The seventh may be used to control an adjustable bolster described below in a non-programmed manner.

The upper and lower turrets 30, 29 are each provided with a series of circularly arranged shot pin receiving recesses 110 which preferably include wear resistant inserts. Two such recesses 110 are shown for each turret in FIG. 8 and an entire series thereof is illustrated in FIG. 9. The structure that cooperates therewith is best shown in FIG. 13. The upper arm 26 supports a double acting fluid actuator, such as of the pneumatic type, indicated at 111 which has a rod 112 which is extendable therefrom and which here constitutes a shot pin having a tapered end for being received in the recesses 110 of the upper turret 30. The shot pin 112 has a groove which serves to actuate a switch plunger 113. In like manner, the lower arm 25 has a similar actuator 114 with a rod extending therefrom which serves as a shot pin 115 for coacting with the recesses 110 of the lower turret 29. The rod or shot pin 115 also is grooved to actuate a further switch plunger 116.

To rotate the turrets, the numerical control 14 signals a move and to effect such move, initiates first a retraction of the shot pins 112, 115. Such retractive movement actuates the switch plungers 113, 116 to complete the circuit to the clutch 64 to initiate turret rotation. Approximately 5° of turret rotation before the selected tool station has reached the desired position, the reading head 109, sensing the code on the code drum 108, initiates an opening of the circuit to the clutch 64 and an actuation of the brakes 65, 66, thereby terminating turret rotation. Such zero speed is sensed by the centrifugal switch 97 which then closes to effect release of the brakes 65, 66 and extension of the shot pins 112, 115 into the recesses 110, the shot pins 112, 115 serving to provide the final increment of precise turret movement to achieve the desired alignment, and to hold the angular positions of the turrets 29, 30, during punching.

The lower turret 29 is carried on a shaft 117 by means of bearings, the shaft 117 being secured to the lower arm 25. An annular block 118 supports a brake 66 and a similar annular block 119 supports the brake 65, there being suitable dust seals provided, acting between at least one of the blocks 118 and the adjacent turret 29, as shown at 120 and 121.

Ram details

The two rams or ram assemblies 47 which are reciprocated by the driven ram 46, are best illustrated in association with other components in FIG. 8, in elevation in FIG. 14, and internally in FIG. 15. Each ram assembly 47 includes an upper non-rotatable section 122, a lower non-rotatable section 123 joined together by means providing a lost motion connection 124. The ram assemblies 47 also include a rotatable section 125 disposed between the sections 122, 123. Each of the sections 122, 123 has an axially facing cam surface 126 directed toward the rotatable section 125 which has corresponding or complemental cam surfaces 127 which face axially toward the cam surfaces 126 for abutment therewith or for interfitting therewith. A rotatable section 125 is rotatably supported and carried on a stem 128 which forms a part of the lost motion connection 124, and in effect comprises a rotatable wedge which either takes up substantially all of the freedom permitted by the lost motion connection 124, or which permits the same. As shown in FIG. 8, a rotatable wedge section 125 is positioned so that the highest points of the cam surfaces 126, 127 are in position to engage each other, while the rotatable wedge section 125 of the right-hand ram assembly 47 is positioned so that the cam surfaces 126, 127 are in an interfitting relationship.

Means are provided for positioning one of the rotatable sections 125 in a punching-effecting angular position, and for positioning the other rotatable section 125 in an idling position. To this end, there is provided an elongated rack 129 which has teeth which mesh with gear teeth on the external periphery of the rotatable sections 125. The rack 129 is slidably guided on the box portion 107 of the upper arm 26 and is reciprocated by an actuator 130 (FIG. 7) to place one of the ram assemblies 47 in an active position and one in an inactive or idling position.

As shown in FIG. 14, there are provided a pair of detent means 130, one for each of the lower sections 123 which hold the lower section 123, the rotatable section 125, the stem 128, and any tooling carried by the lower section 123 in an elevated, retracted, or the illustrated position. The detent 130 is in the form of a spring-biased disk or wheel which has flat sides that are received in a groove 131 in the lower section 123 to render the same non-rotatable, particularly when there is no tooling attached thereto as the tooling usually includes angular keying means. During punching, the detent means 130 readily yield in the selected station, and are restored to the illustrated position on retraction of the ram assembly 47. As seen in FIG. 14, the driven ram 46 transmits punching force through the ram assembly 47 with only guidance provided by the bearings that perform guidance for the upper arm 26. Similarly during punching, all reactive forces are transmitted through the driven ram 46 so that there is no tendency whatever for the frame 26 to breathe or to otherwise lose its ability to provide precise guidance during all portions of the punching stroke.

The upper end of the upper sections 122 comprises a T-head 132 which is received in a T-slot 133 on the lower end of the driven ram 46. As the frame reciprocates in the Y-axis, namely in a direction perpendicular to the drawing of FIG. 4, the T-head and slot connection between the ram assembly 47 and the driven ram 46 remains at all times engaged so that the driven ram 46 can drive the ram assembly 47 at any place where the frame 24 may be stopped. This connection also precludes rotation of the upper sections 122. The lower end of the sections 123 is similarly provided with a T-head 134 for reception in a corresponding T-slot in the tooling carried in each turret station as shown in FIG. 8. The weight of both of the ram assemblies 47, and the driven ram 46 is carried as shown in FIG. 7 by an air balance 135 secured to the spanning structure 22. The air balance 135 is of conventional construction. By this arrangement, the static mass is not carried by the shaft 43. Yet the air balances 135 hold the ram means 45 at such a height that the T-head 134 can make and can release its connection with the tooling and the turret in response to rotation of the upper turret.

As seen in FIG. 15, the lower section 123 of the ram assembly 47 resembles an inverted cup. The stem 128 has a slidable connection with the upper section 122 and with the rotatable section 125 and is rigidly secured to a lower section 123, extending into the interior thereof where it has a cylindrical enlargement 136 spaced from an inner wall 137 of the lower section 123 to define an annular chamber 138 within which there is slidably disposed and guided a fluid-pressure biased piston 139. A fluid pressure line 140 leads through a slot in the upper section 122 and communicates with a passage 141 that leads to the chamber 138. On application of fluid pressure to the chamber 138, the piston 139 is biased in a downward direction to a position limited by a ram plate 142 which is secured centrally and peripherally to the stem 128 and which has the T-head 134 integral therewith. The piston 139 at its lower end has an inwardly directed annular shoulder 143 which is apertured so that suitable spacers 144 may pass therethrough. The outer periphery of the ram plate 142 has a series of alternately spaced fingers 145 and spaces 146 while the lower end of the piston 139 has a series of alternately spaced fingers 147 extending into the spaces 146. The ram plate 142 also has a number of trapped plungers 148 which are engageable with the annular shoulder 143. When pressure is applied to the chamber 138, it in effect serves as a spring urging the piston 139 downwardly for acting on a number of transfer pins 149 which form part of the stripping member that is a part of the tooling carried in the turret. Thus, a stripping force is made available for transfer to a stripping member. The details of the punch, die, and stripper, which form a set, do not form an essential part of the punch press of this invention, and may vary a good deal. To that end, particularly where smaller tooling is employed, the stripper pins 149 may be located somewhat closer to the center, such as for engaging the transfer plugs 148. It is thus desirable that the lower section 123 of the ram means 47 have a selection and an array of transfer plugs 148 or fingers 147 for coaction with a wide variety of types and sizes and styles of tooling. The entire lower surface of the upper section 122 and both surfaces of the rotatable section 125 serve to transmit punching force to the upper surface of the lower section 123. Punching force is transmitted not only through its outer portion, but is transmitted centrally to the enlargement on the stem 128 and by it to the central lower portion of the stem 128 and through the spacers 144 to the ram plate 142.

Tooling station arrangements

Certain tooling is illustrated in FIG. 8 including dies that are representative of actual maximum size dies, for example dies provided with 5-inch openings. The illustration of the tooling cooperating therewith is schematic in nature and represents the maximum external envelope size to be occupied by the stripping and punching elements so that the actual punch size would be one that corresponds to the illustrated die and which is to be reciprocated by the head 134, while the somewhat larger dimension at the tooling station 31 also represents the space to be occupied by the stripping means mentioned above. While there is no limit on how small the actual punch tip might be that is associated in the illustrated tooling envelope, and while there is no limitation on how small the opening in the die may be, it is not practicable to make all of the stations 31, 32 of a size to enable every station to take maximum size tooling.

The number of large stations to be provided, such as illustrated, the number of intermediate size stations, and the number of minimum size stations to be employed in a particular press is to some extent a matter of choice based on probabilities of usage. But once the choice has been made, there are certain basic principles of construction to be followed in building a particular punch press. For example, it is preferable that for every station, there be a diametrically opposite station. Such an arrangement will insure that no matter which station is selected for punching, a second station will be simultaneously placed in alignment. As another example, where different size stations are to be employed, it is preferable that a station of like size be employed diametrically opposite thereto so as to minimize the unbalanced forces on the upper turret.

An example of a useful basic arrangement appears in FIG. 4 which meets the principles just described. A turret or dial of FIG. 4 includes two sizes of tooling envelope. By use of smaller tooling stations, a greater number of tooling stations can be accommodated.

FIG. 9 illustrates a similar geometrical arrangement of tooling stations by which provision is made for tools having three envelope sizes, this view also illustrating certain embellishments or details. FIG. 10 is a further arrangement employing three envelope sizes for circular tooling and a special larger station. In the forms shown in FIGS. 9 and 10, there is a tooling station diametrically opposite to each other tooling station, for receiving tooling of comparable mass. Thus, with any of these arrangements, balance can be quite well approximated and two stations will always be in alignment with the ram means 47.

The arrangement shown in FIG. 10 accommodates not only four large stations as does the arrangement of FIG. 4, but it accommodates two additional smaller stations, and four of the smaller stations are of intermediate size. The primary advantage of the arrangement of FIG. 10 is that a maximum number of tools can be accommodated. In making these comparisons, an assumption is made that the distance between the ram assemblies 47 shall remain a constant, and the envelope size for the small, medium, and large tooling shall be the same in each instance, and therefore the dials or turrets are functionally of the same size since the centers of all of the tools lie on the same circle. The arrangement of FIG. 10 has one disadvantage and that is that the increment of angular rotation or indexing is not uniform, but this non-uniformity has no disadvantage to the user, and thus serves as an advantage in obtaining a turret with the maximum number of tools thereon.

The arrangement of FIG. 9 and of FIG. 4 is considered to be the most preferable since there is a uniformity of angular increments by which the dial may be indexed. If desired, the intermediate size stations illustrated could be replaced by stations corresponding to the maximum size to obtain an arrangement substantially the same as that of FIG. 4. With the arrangement shown in FIGS. 4 and 9, the one pair of diametrically opposite large stations is not disposed at an indexing angle of 90° from the other large stations as is the case in FIG. 10. With the arrangement of FIG. 10, there would be one shot pin hole 110 for each station, but with the arrangement of FIG. 9, there is one shot pin hole 110 for each increment of rotation, such increments being of uniform angle and corresponding to the angle between one of the smallest stations and any adjacent one of such smallest stations. In the construction of FIG. 9 there are 30 indexing positions, each spaced 12° from the other. Each of the smallest tooling stations 150 is therefore spaced 12° from each adjacent small station 150. However, each of the intermediate and the large stations 151, 32 utilizes space occupied by three of the smallest stations 150, and thus by indexing from one station 150 to an adjacent large station 32 or intermediate station 151, the indexing move itself is by an amount corresponding to twice such angle or two indexing increments. With this arrangement, the tool loader 55 is disposed as shown so that when two of the stations are in alignment with the ram means 47, the tool loader 55 is in alignment with a third station. The tool loader, or ejector, are collectively referred to herein as a tool transfer device, and this device may be disposed diametrically opposite to that illustrated in FIG. 9 so that from the tooling station arrangement viewpoint, it makes no difference whether the tool loader is disposed as shown in FIGS. 2 and 9, or diametrically opposite thereto for use with the arrangement of FIG. 16.

In FIG. 9, certain stations have been provided with key ways 152 for aligning tooling angularly that has a noncircular cutting edge, commonly referred to as shaped tooling. One of these key ways may be considered as being basic, as where only one key way is employed, and the others are disposed at 60°, 90° and 135° therefrom to obtain suitable orientation. Further, the key ways 152 may be carried in a special angularly adjustable bushing 153 which can be pressed in or adjustably clamped in any selected angular position to obtain a desired result.

Movable bolster

The use of tooling which enables the punching of a five-inch hole by means of a die carried in a turret coupled with the use of a die having an envelope size smaller than the largest die opening to be accommodated provides a problem in die support which is solved by use of a movable bolster, generally indicated at 154 in FIG. 8 and shown in FIG. 11. To paraphrase the problem, attention is invited to FIG. 8 which shows a die 155 which has a five-inch die opening leading to the slug chute 102 which of necessity is somewhat larger. The slug chute 102 is also shown in FIG. 12 in conjunction with a die 156 which has an outside diameter on the order of two inches or less which would freely drop through the die chute 102 but for the presence of the bolster 154. The lower turret 29 has a dial 157 secured thereto and which has tooling stations such as 32 previously described in detail. The dial 157 is co-rotatable with the turret 29. The bolster 154 has a kidney-shaped section 158 which is secured as by screws or welding to an arcuate portion 159 which is guided at its inner periphery on an outwardly directed surface of the lower turret 29 for being moved about the rotational axis of the turret 29. The bolster section 158 fills in a space between the lower frame arm 25 and the lower surface of the die 155 so that reactive punching forces may be transmitted vertically therethrough, while providing for passage of any slugs to the slug chute 102. Where two punching stations are employed, as disclosed here, a second bolster section 158 is employed in conjunction with that station.

As seen in FIGS. 8 and 11, the bolster section 158 has one aperture 160 which corresponds in size to that of the slug chute 102, and has two smaller angularly spaced apertures 161, 162 for cooperating with the most common or smallest tooling, such as that normally carried at the stations 150, while the aperature 162 is provided to cooperate with intermediate size tooling such as that described for the stations 151.

When tooling is employed that has only two sizes of envelope as shown in FIG. 4, the section 158 needs only to have two sizes of aperture. However, it is still desirable to include a portion or space for the third aperture, with such aperture omitted, such portion enabling the user to put in tooling wherein no slug is created. At any event, in conjunction with use of the punch press disclosed herein, the bolster 154 is positioned about the turret axis so as to dispose an appropriate portion beneath the die to be used.

While such positioning may be done by hand, it is preferable to employ an actuator 163 which is connected to act between the frame 25 and the bolster 154, the actuator 163 being extendible to the positions shown in broken lines for positioning the various bolster portions in alignment with the ram means 47. In the structure of FIG. 11, the actuator 163 is pivotally carried on one side of the lower arm 25 of the frame 24, its rod end being pivotally connected to a depending bracket 164 carried by the bolster ring 159.

The seventh switch mentioned in the description above of the reading head 109 may be used to control the bolster 154. For example, such switch could signal the actuator 163 to position the bolster 154 with that portion of it having the corresponding hole size disposed in an operating position.

However, it is preferable that the bolster 154 be programmed independently to enable a freedom of choice as to which bolster portion is to be used.

A preferred form of movable bolster is shown in outline in FIG. 16 and includes a movable bolster 165 having portions with apertures 166, 167, 168 corresponding to the apertures 160, 161, 162 for alignment with the ram means. The bolster 165 has an arcuate portion 169 for being guided by the lower turret as explained before. As best seen in FIG. 18, the bolster 165 has a pair of actuators 170, 171 having cylinder portions connected together in an end-to-end relationship, and each having a rod 172, 173. The rod 172 is rigidly coupled to a bracket carried on the side of the lower frame arm 25, and the rod 73 is secured to a bracket 174 that is connected to a rigid bar 175 which extends in parallel relation to the actuators 170, 171. At their rod ends, each of the actuators 170, 171 has a further bracket 176 which has a support wheel 177 rolling on the transverse support surface 19 of the base 15. The brackets 176 have bearings which slidably receive and guide the rigid bar 175. Near its midpoint, the rigid bar 175 has a pin and slot connection generally indicated at 178. The bolster 165 comprises two sections which are pinned and bolted together and held by a plate 179 to facilitate assembly onto the turret. The pin and slot connection comprises a radially directed slot 180 in the plate 179 and the pin comprises a roller bearing 181 slidably disposed therein.

As drawn in FIGS. 16 and 18, the parts are in a centered position wherein the apertures 167 are aligned with the punching station. On retraction of the rod of the actuator 170, the two actuators are shifted to the left as shown in FIG. 18, causing the bolster 165 to pivot in a clockwise direction as shown in FIG. 16 to align the larger holes 166 with the rams. When both of the actuators 170, 171 are extended, the bolster 165 is pivoted in the opposite direction by a like amount. The periphery of the bolster 165 includes three vertical slots 182 spaced apart angularly by the angular spacing between the apertures 166–168. Within each of the slots 182, there is provided a binary code member 183, 184 positioned at a selected height to coact with one of a group of control switches generally indicated at 185.

The frame 25 may be provided with a wear strip 186 as shown in FIG. 18.

Although various minor modifications might be made or suggested by those versed in the art, it should be understood that I wish to embody within the scope of the patent warranted hereon, all such embodiments as reasonably and proper come within the scope of my contribution to the art.

I claim as my invention:

1. A punch press, comprising in combination:
   (a) a base adapted to support a workpiece;
   (b) a frame having a pair of spaced arms, said frame being movably supported by said base for linear movement in a plane with respect to the workpiece;
   (c) a pair of turrets adapted to support cooperative tooling in a number of stations, said turrets being disposed between said arms and rotatably supported thereby for rotation about a common axis, said turrets being spaced from each other throughout their extent to receive the workpiece therebetween; and
   (d) ram means supported entirely by said base independently of said frame for reciprocation, and including means operative on tooling disposed in that one of said stations which has been rotated into alignment with said ram means for any position of said frame.

2. A punch press according to claim 1, wherein said ram means includes a pair of alternatively operable ram assemblies disposed to act on tooling carried by diametrically opposite stations on said turrets without rotation of said turrets.

3. A punch press according to claim 2, wherein said ram means further includes a driven ram having a slidable supporting connection with both of said pair of ram assemblies.

4. A punch press according to claim 3, wherein said driven ram is slidably guided by said base, and said ram assemblies are slidably guided by said frame for movement with said frame with respect to said driven ram in a direction perpendicular to the direction of reciprocation.

5. A punch press according to claim 1, including:
   (a) motor means carried by said frame for movement therewith; and
   (b) connecting means drivably coupling said motor means to said pair of turrets for rotating a preselected one of said stations into alignment with said ram means.

6. A punch press according to claim 5, wherein said motor means is a single motor, and said connecting means has separate branches jointly drivin in parallel by said motor, each of said branches driving one of said turrets.

7. A punch press according to claim 6, wherein said single motor normally is continually rotating, and wherein said connecting means includes selectively alteratively actuatable clutch means and friction brake means acting on each of said turrets.

8. A punch press according to claim 1, including a selectively operable tooling ejector carried by said frame adjacent to one of said turrets in alignment with one of said stations remote from said ram means, said ejector being operative to eject the cooperating tooling from both of said turrets.

9. A punch press according to claim 1, including
   (a) a selectively operable tooling loader for inserting the cooperative tooling into both of said turrets; and
   (b) means carried by said base disposing said tooling loader adjacent to one of said turrets in alignment with one of said stations remote from said ram means.

10. A punch press according to claim 8, in which said turret which is the more remote from said tooling ejector has stations which are larger than those of the other turret to enable the tooling of said other turret to pass therethrough in response to operation of said tooling ejector.

11. A punch press according to claim 9, in which said turret which is the closer to said tool loader has stations which are larger than those of the other turret to enable the tooling of said other turret to pass therethrough in response to operation of said tooling loader.

12. A punch press according to claim 1, in which said base has means disposed at a fixed location for directly engaging and supporting the workpiece substantially throughout the extent of its area.

13. A punch press according to claim 1, in which said spaced arms are rigidly joined together at opposite sides of said pair of turrets.

14. A punch press according to claim 2, in which each ram assembly includes:
 (a) a rotatable section through which punching force is axially transmitted, said rotatable section having a cam surface facing in an axial direction; and
 (b) at least one non-rotatable section having a cam surface facing said first-named cam surface;
 (c) said cam surfaces interfitting axially for one angular position of said rotatable section, and being abuttable with each other at their highest points for another angular position of said rotatable section.

15. A punch press according to claim 14, which includes means carried by said frame and connected to said rotatable sections of both of said ram assemblies for positioning one of said rotatable sections in an interfitting inactive position and the other of said rotatable sections in a noninterfitting active position.

16. A punch press according to claim 15 in which said positioning means comprises:
 (a) an elongated rack guided for longitudinal movement by said frame and having teeth meshing with teeth on the peripheries of said rotatable sections; and
 (b) a fluid actuator carried by said frame and connected to said rack.

17. A punch press according to claim 2, in which each ram assembly includes:
 (a) a pair of axially spaced sections connected together by means for providing axial lost motion therebetween; and
 (b) a wedge carried between said sections, said wedge being positionable in a punching position in which motion between said sections is substantially precluded, and in an idling position in which said lost motion means precludes transmission of punching force therethrough.

18. A punch press according to claim 17, which includes means connecting said wedges of said ram assemblies together by which said wedges are disposed simultaneously in opposite ones of said positions.

19. A punch press according to claim 17, which includes a pair of detent means carried by said frame for respectively acting on the lower ones of said axially spaced sections for holding each one in its retracted position during punching by the other.

20. A punch press according to claim 5, which includes:
 (a) a ram assembly forming part of said ram means;
 (b) a bearing carried by said frame, said bearing receiving and slidably guiding said ram assembly; and
 (c) a ring gear forming part of said connecting means, and being internally supported by the exterior of said bearing.

21. A punch press according to claim 5, which includes:
 (a) a ram assembly forming part of said ram means; and
 (b) a ring gear forming part of said connecting means and supported in concentric encircling relation to the axis of said ram assembly.

22. A punch press according to claim 5, which includes:
 (a) a bolster ring disposed between the lower of said arms and the lower of said turrets in alignment with said ram means and through which reactive die supporting force is transmitted during punching, said ring having a central aperture forming part of a slug chute; and
 (b) a ring gear forming part of said connecting means and being internally supported for rotation by the exterior of said bolster ring.

23. A punch press acocrding to claim 1, in which certain of said turret stations differ somewhat in size from that of other of said stations for receiving cooperative tooling of a somewhat different size envelope, and which includes a movable bolster disposed between the lower of said arms and the lower of said turrets, and having at least two portions positionable selectably in alignment with said ram means and through which portions reactive die supporting force is transmitted during punching, said portions having somewhat different size slug chutes extending therethrough for coaction with said tooling having envelopes of differing sizes.

24. A punch press according to claim 6 in which one of said branches comprises gearing disposed at the upper side of the lower of said arms for driving the lower of said turrets, and in which the other of said branches comprises gearing disposed at the lower side of the upper of said arms for driving the upper of said turrets.

25. A punch press according to claim 1, in which said stations are of more than one size for accepting tooling having envelopes of different sizes, said stations being so arranged on said turrets that stations of corresponding size are diametrically opposed.

26. A punch press according to claim 2, in which said stations are of more than one size for accepting tooling having envelopes of different sizes, said stations being so arranged on said turret that every station has a diametrically opposite station, whereby two of said stations will always be aligned with said ram assemblies during punching.

27. A punch press according to claim 1, in which said stations are of more than one size for accepting tooling having envelopes of different sizes, the smallest size stations being spaced from all adjacent ones of said smallest stations by a uniform angle, and all other larger stations being spaced from adjacent ones of said stations by an angle which is a multiple of said uniform angle.

28. A punch press according to claim 27 which includes a tool transfer device disposed at an angle about the turret axis which is a multiple of said uniform angle from the axis of said ram means.

29. A punch press according to claim 2, in which:
 (a) all said stations are angularly spaced from each other by a uniform basic angle or a multiple thereof, each station being diametrically opposite to another;
 (b) a tool transfer device; and
 (c) means for positioning said turrets in increments of said basic angle to simultaneously align opposite stations with said ram means and a third station with said tool transfer device.

30. A punch press according to claim 23, in which said movable bolster has an arcuate portion disposed against and guided by the lower one of said turrets.

31. A punch press according to claim 30, in which an actuator means is connected to act between said frame and said bolster for moving said bolster.

32. A punch press according to claim 1, which includes a pair of power-actuated shot pins respectively carried by said upper and lower arms of said frame and respectively engageable with said turrets to define predetermined positions in which said stations are aligned with said ram means.

33. A punch press according to claim 17, which includes keying means carried by said frame for acting on the lower ones of said axially spaced sections to preclude rotation thereof.

34. A punch press according to claim 19, in which said detent means also have side portions which comprise an angular keying means between said frame and said lower sections.

35. A punch press according to claim 1, in which said ram means has a driving connection with the reciprocable tooling in the turret station aligned therewith, said driving connection being made and released in response to rotation of the upper one of said turrets.

36. A punch press according to claim 35, in which a fluid-pressure biased piston is sliably disposed in said ram means, and is provided with means for transmitting a stripping force to a stripping member forming a part of such tooling.

37. A punch press according to claim 9, in which
    (a) said base has a laterally directed opening clear of any obstruction and adjacent to said tooling loader; and
    (b) a pivotable base section normally closing said opening and providing workpiece support.

38. A punch press according to claim 37 which includes a power actuator connected to said base section for pivoting it to open and closed positions.

39. A punch press according to claim 1, which includes:
    (a) a pair of fluid actuators, each having a cylinder and a rod connected between said base and said frame; and
    (b) a fluid system connected to said actuators for moving said frame in one direction in response to tensioning of one rod, and in the opposite direction in response to tensioning of the other rod.

40. A punch press according to claim 39, in which said rods are connected to said frame, and in which fluid pressure is applied only to the rod-ends of said actuators.

41. A punch press according to claim 31, in which said actuator means has a pivotal connection between its cylinder and said frame, and a pivotal connection between its rod and said bolster.

42. A punch press according to claim 31, in which said actuator means comprises two actuators whose cylinders are connected together end-to-end, the rod of one actuator being connected to said frame and the rod of the other actuator being connected to a rigid bar extending parallel to said actuators and having external sliding connections with their cylinders, there being a pin and slot connection between said rigid bar and said bolster.

43. A punch press according to claim 31, in which said actuator means has support wheel means carried by its cylinder and rolling on said base.

44. A punch press according to claim 31, in which said bolster is provided with digital code means, and which includes a sensing head responsive to said code means for controlling said actuator means to enable programming of said bolster independent of the angular position of said turrets.

45. A punch press, comprising in combination:
    (a) a base adapted to support a workpiece;
    (b) a frame having a pair of spaced arms, said frame being movably supported by said base for linear movement in a plane with respect to the workpiece;
    (c) means adapted to support cooperative punch and die tooling between said arms for acting against opposite sides of a workpiece received between said arms;
    (d) ram means supported entirely by said base independently of said frame for reciprocation, and operative on such tooling, said ram means including a portion reciprocably guided by said base for reciprocation in a fixed position, and a portion reciprocably guided by said frame for reciprocation in a fixed position movable with said frame; and
    (e) means secured by said base for moving the workpiece in a direction transverse to said linear movement of said frame and parallel to said plane.

46. A punch press as claimed in claim 45 in which said spaced arms are rigidly joined together at opposite sides of said tooling support means.

47. A punch press as claimed in claim 45 in which said base includes portions which extend upwardly on opposite sides of said tooling support means, and between which portions the workpiece will normally pass, said portions providing the support of said ram means.

48. A punch press as claimed in claim 47 in which said upwardly extending portions overlie said frame to enable an end of said frame to move through the adjacent one of said portions.

49. A punch press as claimed in claim 48, in which means are provided at said portions to provide guidance for one of said frame arms.

50. A punch press as claimed in claim 45, in which said base includes four rectangularly-arranged upwardly-extending portions jointly providing the support of said ram means, each of said portions with one of the adjacent said portions defining a first space through which said frame can move, and with the other of the adjacent said portions defining a second space through which the workpiece can move.

51. A punch press according to claim 45, in which said tooling support means is adapted to support a pair of sets of punch and die tooling simultaneously in alignment with said ram means, and said ram means includes a driven ram and a pair of alternatively operable ram assemblies respectively aligned with said pair of sets of punch and die tooling.

52. A punch press according to claim 51, including:
    (a) a motor for acting between said base and said frame to provide said linear movement of said frame; and
    (b) numerical control means connected to control said frame motor to translate said pair of sets of punch and die tooling in one axis, to control reciprocation of said driven ram, to place a selected one of said ram assemblies in a ready condition, and to control said workpiece moving means to translate the workpiece in a second axis.

53. A punch press according to claim 45, which further includes:
    (a) a motor for acting between said base and said frame to provide said linear movement of said frame;
    (b) workpiece cut-off means disposed adjacent to one end of said base; and
    (c) numerical control means connected to control said frame motor to translate the punch and die tooling in one axis, to control said ram means, to control said workpiece cut-off means, and to control said workpiece moving means to translate the workpiece in a second axis.

54. A punch press according to claim 45, which further includes:
    (a) a motor for acting between said base and said said frame to provide said linear movement of said frame;
    (b) workpiece feeding means disposed adjacent to an end of said base for placing a workpiece thereon; and
    (c) numerical control means connected to control said frame motor to translate the punch and die tooling in one axis, to control said ram means, to control said workpiece feeding means, and to control said workpiece moving means to translate the workpiece in a second axis.

55. A punch press according to claim 45, in which said base comprises:
    (a) a pair of vertically extending portions joined together at their upper ends by a spanning portion which provides the support for said ram means, and joined together at their lower ends by a frame support member which has a transverse support surface on which said frame is supported; and (b) at least one table portion extending horizontally from said frame support member and supporting said workpiece moving means.

56. A punch press according to claim 55, which includes means connected between said frame support member and said table portion for adjusting the squareness of frame movement with respect to workpiece movement.

57. A punch press according to claim 45, in which said workpiece moving means includes a longitudinally driven elongated rigid member to which the workpiece is to be secured, and a series of individually adjustable rollers supporting and guiding said elongated rigid member.

58. A punch press according to claim 57, which includes a series of elongated strips of flexible tool-steel bonded to said elongated rigid member and engaged by said adjustable rollers.

59. A punch press according to claim 58, in which said strips are secured to said rigid memebr by means of dry-removal adhesive transfer tape of the type requiring no heat curing.

60. A punch press according to claim 45, in which said moving means comprises a single rack and a single pinion coacting therewith, said pinion being connected to (1) means to provide moving power, (2) means to indicate rack position, and (3) means to indicate rack velocity.

61. A punch press according to claim 47 which includes a pair of tie rods in each of said upwardly extending portions and arranged to be tensioned in reaction to punching forces exerted by said ram means.

References Cited

UNITED STATES PATENTS

| | | | |
|---|---|---|---|
| 1,241,257 | 9/1917 | Wurts et al. | 83—71 |
| 1,298,555 | 3/1919 | Payne et al. | 83—71 |
| 2,363,208 | 11/1944 | Sulzer | 83—552 |

ANDREW R. JUHASZ, *Primary Examiner.*

JAMES F. COAM, *Assistant Examiner.*

U.S. Cl. X.R.

83—164, 215, 277, 552